United States Patent
Yano

(10) Patent No.: US 8,759,435 B2
(45) Date of Patent: Jun. 24, 2014

(54) CURABLE COMPOSITION AND CURED ARTICLE EXCELLENT IN TRANSPARENCY

(75) Inventor: Ayako Yano, Takasago (JP)

(73) Assignee: Kaneka Corporation, Osaka (JP)

( * ) Notice: Subject to any disclaimer, the term of this patent is extended or adjusted under 35 U.S.C. 154(b) by 908 days.

(21) Appl. No.: 11/918,446

(22) PCT Filed: Apr. 12, 2006

(86) PCT No.: PCT/JP2006/307782
§ 371 (c)(1),
(2), (4) Date: Oct. 15, 2007

(87) PCT Pub. No.: WO2006/112340
PCT Pub. Date: Oct. 26, 2006

(65) Prior Publication Data
US 2009/0087635 A1 Apr. 2, 2009

(30) Foreign Application Priority Data
Apr. 15, 2005 (JP) ................................. 2005-118821

(51) Int. Cl.
*C08K 5/098* (2006.01)
(52) U.S. Cl.
USPC ........................................................ 524/493
(58) Field of Classification Search
USPC ........................................................ 524/493
See application file for complete search history.

(56) References Cited

U.S. PATENT DOCUMENTS

| | | |
|---|---|---|
| 447,628 A | 3/1891 | Woolrey |
| 2,474,350 A | 6/1949 | Eilerman, etal. |
| 2,928,859 A | 3/1960 | Preston et al. |
| 3,632,557 A | 1/1972 | Brode et al. |
| 3,661,885 A | 5/1972 | Haddick et al. |
| 3,857,825 A | 12/1974 | Streck et al. |
| 3,888,815 A | 6/1975 | Bessmer et al. |
| 3,971,751 A | 7/1976 | Isayama et al. |
| 4,444,974 A | 4/1984 | Takase et al. |
| 4,449,938 A | 5/1984 | Pollak |
| 4,472,551 A | 9/1984 | White et al. |
| 4,507,469 A | 3/1985 | Mita et al. |
| 4,559,387 A | 12/1985 | Endo et al. |
| 4,562,237 A | 12/1985 | Okuno et al. |
| 4,593,068 A | 6/1986 | Hirose et al. |
| 4,657,986 A | 4/1987 | Isayama et al. |
| 4,683,250 A | 7/1987 | Mikami |
| 4,687,818 A | 8/1987 | Kawakubo et al. |
| 4,720,530 A | 1/1988 | Würminghausen et al. |
| 4,750,934 A | 6/1988 | Metzner et al. |
| 4,818,790 A | 4/1989 | Ooka et al. |
| 4,878,305 A | 11/1989 | Gabrielidis et al. |
| 4,904,732 A | 2/1990 | Iwahara et al. |
| 4,910,255 A | 3/1990 | Wakabayashi et al. |
| 4,954,565 A | 9/1990 | Liles |
| 4,960,844 A | 10/1990 | Singh |
| 4,977,228 A | 12/1990 | Wakabayashi et al. |
| 5,376,720 A | 12/1994 | Ando |
| 5,399,607 A | 3/1995 | Nanbu et al. |
| 5,554,709 A | 9/1996 | Emmerling et al. |
| 5,639,825 A | 6/1997 | Nanbu et al. |
| 5,648,427 A | 7/1997 | Fujita et al. |
| 5,807,921 A | 9/1998 | Hill et al. |
| 5,973,047 A | 10/1999 | Ernst et al. |
| 5,986,014 A | 11/1999 | Kusakabe et al. |
| 6,204,350 B1 | 3/2001 | Liu et al. |
| 6,207,766 B1 | 3/2001 | Doi et al. |
| 6,271,309 B1 | 8/2001 | Roberts et al. |
| 6,287,701 B1 | 9/2001 | Oochi et al. |
| 6,300,278 B1 | 10/2001 | Saito et al. |
| 6,310,118 B1 | 10/2001 | Atarashi et al. |
| 6,350,345 B1 | 2/2002 | Kotani et al. |
| 6,369,187 B1 | 4/2002 | Fujita et al. |
| 6,407,146 B1 | 6/2002 | Fujita et al. |
| 6,410,640 B1 | 6/2002 | Fukunaga et al. |
| 6,420,492 B1 | 7/2002 | Kusakabe et al. |
| 6,441,101 B1 | 8/2002 | Kusakabe et al. |
| 6,486,289 B1 | 11/2002 | Yamaguchi et al. |
| 6,569,980 B1 | 5/2003 | Masaoka et al. |
| 6,642,309 B2 | 11/2003 | Komitsu et al. |

(Continued)

FOREIGN PATENT DOCUMENTS

| | | |
|---|---|---|
| CA | 2302869 A1 | 9/2002 |
| EP | 0108946 B1 | 5/1984 |

(Continued)

OTHER PUBLICATIONS

Machine translation of JP 4-292616 (JP 4-292616 previously submitted on Mar. 14, 2011).

*Primary Examiner* — Doris Lee
(74) *Attorney, Agent, or Firm* — Sughrue Mion, PLLC

(57) ABSTRACT

An object of the invention is to yield a highly transparent cured article wherein bubbles are less generated when a catalyst and others are added to a curable composition that contains an organic polymer having a silicon-containing group which can be crosslinked by the formation of a siloxane bond and then the resultant mixture is stirred. Another object thereof is to provide a cured article which is small in surface stickiness, slightly gets dirty over a long term, and has a practical adhesiveness. These objects are attained by a curable composition which comprises (A) an organic polymer having a silicon-containing group that can be crosslinked by the formation of a siloxane bond, (B) a bivalent tin carboxylate and (C) an amine compound having no reactive silicon group, and which turns transparent when cured; or a transparent cured article obtained by curing the composition.

9 Claims, 1 Drawing Sheet

(56) References Cited

U.S. PATENT DOCUMENTS

| | | |
|---|---|---|
| 6,703,442 B1 | 3/2004 | Ando et al. |
| 6,720,373 B2 | 4/2004 | Lin et al. |
| 6,884,852 B1 | 4/2005 | Klauck et al. |
| 7,115,695 B2 | 10/2006 | Okamoto et al. |
| 2002/0016411 A1 | 2/2002 | Ando et al. |
| 2002/0048680 A1 | 4/2002 | Yamanaka |
| 2002/0086942 A1 | 7/2002 | Fujita et al. |
| 2002/0115811 A1 | 8/2002 | Huang et al. |
| 2002/0177670 A1 | 11/2002 | Kusakabe et al. |
| 2003/0096904 A1 | 5/2003 | Hakuta et al. |
| 2003/0176576 A1 | 9/2003 | Fujita et al. |
| 2004/0074598 A1* | 4/2004 | Ando et al. ............ 156/325 |
| 2004/0181025 A1 | 9/2004 | Schindler et al. |
| 2004/0214950 A1 | 10/2004 | Nakamura et al. |
| 2004/0266950 A1 | 12/2004 | Yano et al. |
| 2005/0171315 A1 | 8/2005 | Wakabayashi et al. |
| 2005/0269405 A1 | 12/2005 | Throckmorton et al. |
| 2006/0079645 A1* | 4/2006 | Hasegawa et al. ......... 525/191 |
| 2006/0089432 A1 | 4/2006 | Kawakami et al. |
| 2006/0128919 A1 | 6/2006 | Okamoto et al. |
| 2006/0189736 A1* | 8/2006 | Mori et al. ............ 524/404 |
| 2006/0199933 A1 | 9/2006 | Okamoto et al. |
| 2006/0252903 A1 | 11/2006 | Wakabayashi et al. |
| 2006/0264545 A1 | 11/2006 | Wakabayashi et al. |
| 2007/0167583 A1* | 7/2007 | Yano et al. ............ 525/474 |
| 2007/0203297 A1 | 8/2007 | Wakabayashi et al. |
| 2008/0188624 A1 | 8/2008 | Yano et al. |

FOREIGN PATENT DOCUMENTS

| | | | |
|---|---|---|---|
| EP | 0 109 979 A1 | 6/1984 | |
| EP | 0252372 A1 | 1/1988 | |
| EP | 0 473 793 A1 | 3/1992 | |
| EP | 0473793 A1 | 3/1992 | |
| EP | 0 538 880 A2 | 4/1993 | |
| EP | 0538881 A2 | 4/1993 | |
| EP | 0546310 A2 | 6/1993 | |
| EP | 0673972 A1 | 9/1995 | |
| EP | 0 839 872 A2 | 5/1998 | |
| EP | 0918062 A1 | 5/1999 | |
| EP | 1000980 A1 | 5/2000 | |
| EP | 1024170 A1 | 8/2000 | |
| EP | 1285946 A1 | 2/2003 | |
| EP | 1445287 A1 | 8/2004 | |
| EP | 1 514 903 A1 | 3/2005 | |
| EP | 1550700 A1 | 7/2005 | |
| EP | 1471113 B1 | 8/2007 | |
| JP | 55-9669 A | 1/1980 | |
| JP | 59-74149 A | 4/1984 | |
| JP | 59-78223 A | 5/1984 | |
| JP | 59-122541 A | 7/1984 | |
| JP | 60-4576 A | 1/1985 | |
| JP | 60-31556 A | 2/1985 | |
| JP | 62-13452 A | 1/1987 | |
| JP | 63-6003 A | 1/1988 | |
| JP | 63-6041 A | 1/1988 | |
| JP | 63-097674 A | 4/1988 | |
| JP | 3-122163 A | 5/1991 | |
| JP | 04-154829 A | 5/1992 | |
| JP | 4-202481 A | 7/1992 | |
| JP | 4-292616 A | 10/1992 | |
| JP | 05-001225 A | 1/1993 | |
| JP | 5039428 A | 2/1993 | |
| JP | 5-117519 A | 5/1993 | |
| JP | 6-157754 A | 6/1994 | |
| JP | 6-322251 A | 11/1994 | |
| JP | 06-322251 A | 11/1994 | |
| JP | 08-041358 A | 2/1996 | |
| JP | 8-127724 A | 5/1996 | |
| JP | 08-231919 A | 9/1996 | |
| JP | 9-12860 A | 1/1997 | |
| JP | 09012860 A * | 1/1997 | ............ C08L 71/02 |
| JP | 9-141193 A | 6/1997 | |
| JP | 52-073998 A | 6/1997 | |
| JP | 9-183902 A | 7/1997 | |
| JP | 9-272714 A | 10/1997 | |
| JP | 10-251552 A | 9/1998 | |
| JP | 2880728 B2 | 1/1999 | |
| JP | 11-100433 A | 4/1999 | |
| JP | 11-116686 A | 4/1999 | |
| JP | 2000-119488 A | 4/2000 | |
| JP | 2000109678 | 4/2000 | |
| JP | 2000-136313 A | 5/2000 | |
| JP | 3062626 B2 | 5/2000 | |
| JP | 2000-169698 A | 6/2000 | |
| JP | 2000-345054 A | 12/2000 | |
| JP | 2001-019842 A | 1/2001 | |
| JP | 2001-072855 A | 3/2001 | |
| JP | 2001-163918 A | 6/2001 | |
| JP | 2001-172515 A | 6/2001 | |
| JP | 2001181532 | 7/2001 | |
| JP | 2001342363 A | 12/2001 | |
| JP | 2002-020458 A | 1/2002 | |
| JP | 2002-37969 A | 2/2002 | |
| JP | 3435351 B | 2/2002 | |
| JP | 2002-155201 A | 5/2002 | |
| JP | 2002-285018 A | 10/2002 | |
| JP | 2003-313421 A | 6/2003 | |
| JP | 2004-043737 A | 2/2004 | |
| JP | 2004-059870 A | 2/2004 | |
| JP | 2004-189946 A | 7/2004 | |
| JP | 2004-277751 A | 10/2004 | |
| JP | 2004-292621 A | 10/2004 | |
| JP | 2006-316287 A | 11/2006 | |
| JP | 4101632 B2 | 6/2008 | |
| JP | 2008-150627 A | 7/2008 | |
| JP | 2008-179830 A | 8/2008 | |
| JP | 4150220 B2 | 9/2008 | |
| WO | 9948942 A1 | 9/1999 | |
| WO | 00/56817 A1 | 9/2000 | |
| WO | 2004/031300 A1 | 4/2004 | |
| WO | WO 2004/074381 * | 9/2004 | |
| WO | WO 2005/007751 * | 1/2005 | |
| WO | WO 2005023938 A1 * | 3/2005 | ............ C08L 101/10 |

* cited by examiner

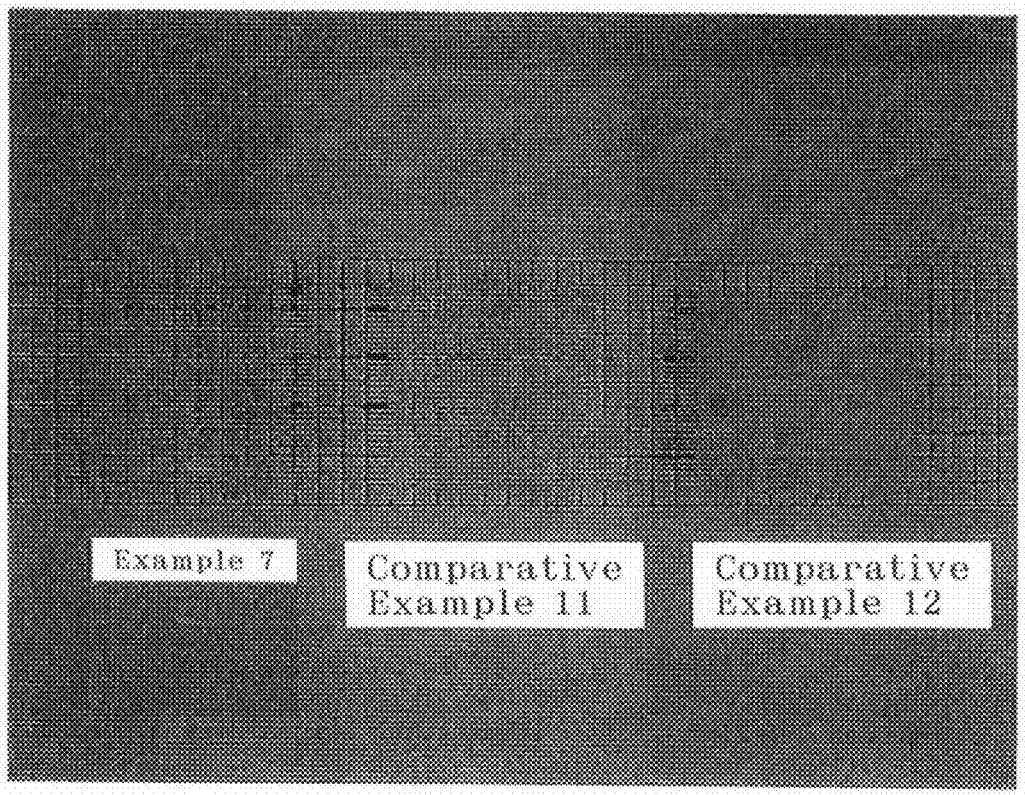

CURABLE COMPOSITION AND CURED ARTICLE EXCELLENT IN TRANSPARENCY

CROSS REFERENCE TO RELATED APPLICATIONS

This application is a National Stage of International Application No. PCT/JP2006/307782, filed on Apr. 12, 2006, claiming priority based on Japanese Patent Application No. 2005-118821, filed Apr. 15, 2005, the contents of all of which are incorporated herein by reference in their entirety.

TECHNICAL FIELD

The present invention relates to a curable composition that contains an organic polymer having silicon-containing group(s) which have a hydroxyl group or hydrolyzable group bonded to a silicon atom and can be crosslinked by the formation of a siloxane bond (the silicon-containing group being also referred to as a "reactive silicon group" hereinafter), and a cured article therefrom.

BACKGROUND ART

It is known that organic polymers each containing in the molecule thereof at least one reactive silicon group are crosslinked by the formation of a siloxane bond which follows a hydrolysis reaction of the reactive silicon group or some other reaction on the basis of moisture or the like at room temperature, so that a rubbery cured article is obtained. The reactive silicon group referred to in the present invention means silicon-containing group(s) which have a hydroxyl group or hydrolyzable group bonded to a silicon atom and can be crosslinked by the formation of a siloxane bond.

Out of these polymers having a reactive silicon group, organic polymers having a main chain made of a polyoxyalkylene polymer or isobutylene polymer have already been produced industrially, and have widely been used in articles such as a sealant, an adhesive, and a paint (Patent Documents 1 and 2).

In the case that the polymers are each used as a sealant, an adhesive or a paint, the formulation thereof is a nontransparent formulation into which calcium carbonate, clay, talc, pigment or the like is incorporated in almost all cases. When an organic polymer having a reactive silicon group is used as a sealant for building or an industrial sealant, it is necessary that the polymer matches with a substrate around it and thus it is necessary to prepare the color species of the sealant the number of which is equal to that of colors of substrates. Thus, there is a drawback that various kinds thereof are required to be in stock. However, a transparent and colorless sealant can match with any wall color so that this drawback can be overcome.

When the polymer is used as an adhesive, the adhesive itself is not seen from the outside; however, when the adhesive is applied in a large amount or an inconvenience is caused in constructing execution, the adhesive is forced out from the jointed portions. Thus, if the adhesive is a colored adhesive, there arises a problem that the external appearance deteriorates. About transparent and colorless adhesives, a forced-out portion thereof is not inconspicuous so that the external appearance is not disfigured. From such a background, a transparent composition is preferable in some cases. A curable composition excellent in transparency wherein an organic polymer having a reactive silicon group is used are known (Patent Documents 3, 4, 5, 6 and 7).

In many of these compositions, an organotin-based catalyst having a carbon-tin bond, such as dilaurate dibutyltin or diacetylacetonate dibutyltin, is widely used as a silanol curing catalyst. In recent years, however, about organotin-based compounds, the toxicity thereof has been pointed out. Thus, organotin-free catalysts are required to be developed. As such organotin-free catalysts, suggested are catalyst systems wherein various metal carboxylates, or a combination of a carboxylic acid and an amine compound is used (Patent Documents 8, 9, 10, 11, 12, 13, 14, 15, 16, 17, and 18).

Patent Document 1: JP-A-52-73998
Patent Document 2: JP-A-63-6041
Patent Document 3: Japanese Patent No. 3435351
Patent Document 4: JP-A-2002-37969
Patent Document 5: JP-A-2003-313421
Patent Document 6: JP-A-2004-277751
Patent Document 7: JP-A-2004-292621
Patent Document 8: JP-A-55-9669
Patent Document 9: Japanese Patent No. 3062626
Patent Document 10: JP-A-5-117519
Patent Document 11: JP-A-6-322251
Patent Document 12: JP-A-9-12860
Patent Document 13: JP-A-11-116686
Patent Document 14: WO 00-56817
Patent Document 15: WO 04-31300
Patent Document 16: JP-A-2000-345054
Patent Document 17: JP-A-2002-285018
Patent Document 18: JP-A-2004-189946

DISCLOSURE OF THE INVENTION

Problems to be Solved by the Invention

It is an objective of the invention to provide a transparent curable composition and a transparent cured article which each contain an organic polymer having a reactive silicon group. The composition is a curable composition which uses an organotin-free curing catalyst low in toxicity, becomes a cured article high in transparency when the composition is cured, and has a practical adhesiveness to a transparent substrate, and the cured article has a surface small in tackiness, and which stains such as dust do not easily adhere to.

Means for Solving the Problems

The inventor has found out that in the case of using a bivalent tin carboxylate as a catalyst together with an amine compound as a cocatalyst in a composition containing, as a component, an organic polymer having a reactive silicon group, and stirring the mixture sufficiently to produce a cured article, the obtained cured article is high in transparency. When a curable composition containing an organic polymer having a reactive silicon group, a curing catalyst, and others are stirred to mix the components, the mixture is usually cured in a state that they contain small bubbles; therefore, a cured article low in transparency is obtained. However, in the case of using a bivalent tin carboxylate, an initially cured article contains small bubbles so as to give a low transparency but the bubbles disappear with the passage of time, thereby yielding a cured article high in transparency.

Accordingly, the present invention relates to a curable composition or a transparent cured article which comprises, as components, (A) an organic polymer having a reactive silicon group, (B) a bivalent tin carboxylate, and (C) an amine compound having no reactive silicon group.

The main chain of the component (A) is preferably at least one polymer selected from the group consisting of polyoxyalkylene polymers, saturated hydrocarbon polymers, and (meth)acrylic acid ester polymers, and is more preferably a polyoxypropylene polymer. The component (A) is preferably a mixture composed of a polyoxypropylene polymer having a reactive silicon group, and a (meth) acrylic acid ester polymer having a reactive silicon group.

The bivalent tin carboxylate as the component (B) is a silanol catalyst for crosslinking the component (A), and is preferably a bivalent tin carboxylate wherein the carbon atom adjacent to the carbonyl group is tertiary or quaternary.

The amine compound having no reactive silyl group as the component (C) is a component necessary for raising the activity of the component (B).

Silica, which is a component (D), is a component for inducing the thixotropy of the curable composition or the strength of the cured article therefrom, and is preferably silica having a surface subjected to treatment for the acquisition of hydrophobicity in order to make the silica compatible with the component (A).

Effects of the Invention

Even when a cured article is produced from the curable composition of the invention, by mixing components therein immediately before the use thereof, in a state that bubbles generated when the components are stirred remains, the bubbles generated in the stirring disappear in several days after the production. Consequently, a transparent cured article is given. The cured article of the invention hardly contains bubbles so as to give an excellent transparency, and has a practical adhesiveness. Furthermore, the article is small in surface stickiness, so that stains do not adhere easily to the article. As a result, the article can maintain such a beautiful appearance that transparency is kept for a long term.

BRIEF DESCRIPTION OF THE DRAWINGS

FIG. 1 shows photographs of external appearances of cured articles of example 7 and comparative examples 11 and 12.

BEST MODE FOR CARRYING OUT THE INVENTION

The invention will be described in detail hereinafter.

The main chain skeleton of the organic polymer used in the present invention, which has a reactive silicon group, is not particularly limited. Organic polymers having various main chain skeletons can be used.

Specific examples thereof include polyoxyalkylene polymers, such as polyoxyethylene, polyoxypropylene, polyoxybutylene, polyoxytetramethylene, polyoxyethylene-polyoxypropylene copolymer, and polyoxypropylene-polyoxybutylene copolymer; hydrocarbon polymers, such as ethylene-propylene copolymer, polyisobutylene, copolymer made from isobutylene and isoprene or the like, polychloroprene, polyisoprene, copolymer made from isoprene or butadiene, and acrylonitrile and/or styrene or the like, polybutadiene, copolymer made from isoprene or butadiene, acrylonitrile, and styrene or the like, hydrogen polyolefin polymers obtained by hydrogenating these polyolefin polymers; polyester polymers each obtained by condensing a bibasic acid, such as adipic acid, and glycol, or by ring-opening-polymerizing a lactone; (meth) acrylic acid ester polymers each obtained by radical-polymerizing a monomer such as ethyl (meth)acrylate or butyl (meth)acrylate; vinyl polymers each obtained by radical-polymerizing a (meth) acrylic acid ester monomer, a monomer such as vinyl acetate, acrylonitrile, styrene, or some other monomer; graft polymers each obtained by polymerizing a vinyl monomer in any one of the above-mentioned organic polymers; polysulfide polymers; polyamide polymers, such as nylon 6, which is obtained by ring-opening-polymerizing ε-caprolactam, nylon 6,6, which is obtained by polycondensing hexamethylenediamine and adipic acid, nylon 6,10, which is obtained by polycondensing hexamethylenediamine and sebacic acid, nylon 11, which is obtained by polycondensing ε-aminoundecanoic acid, nylon 12, which is obtained by ring-opening polymerizing ε-aminolaurolactam, and any copolymer nylon that has two or more components out of the above-mentioned nylons; polycarbonate polymers, an example of which is produced by polycondensing bisphenol A and carbonyl chloride, and diallyl phthalate polymers.

Furthermore, more preferred are saturated hydrocarbon polymers, such as polyisobutylene, hydrogenated polyisoprene and hydrogenated polybutadiene, the polyoxyalkylene polymers, and the (meth)acrylic acid ester polymers since they have a relatively low glass transition temperature and the cured articles obtained therefrom are excellent in cold resistance.

The polyoxyalkylene polymers and the (meth) acrylic acid ester polymers are particularly preferred since they are excellent in adhesiveness, and the polyoxyalkylene polymers are most preferred.

The glass transition temperature of the organic polymer which is the component (A) is not particularly limited, and is preferably 20° C. or lower, more preferably 0° C. or lower, and in particular preferably −20° C. or lower. If the glass transition temperature is higher than 20° C., the viscosity becomes high in winter or in cold districts so that the workability may deteriorate. Moreover, the flexibility of the cured article may lower and the elongation characteristic may lower. The glass transition temperature is a value based on the DSC measurement.

The polyoxyalkylene polymers and the (meth) acrylic acid ester polymers are in particular preferred since they are high in moisture permeability, and are excellent in depth curability when they are each made into a one-component composition. The polyoxyalkylene polymers are most preferred.

The reactive silicon group contained in the organic polymer in the invention is a group which has a hydroxyl group or hydrolyzable group bonded to a silicon atom and can be crosslinked by reaction accelerated by a curing catalyst. The reactive silicon group may be a group represented by the following general formula (2):

$$—(SiR^3{}_{2-b}X_bO)m\text{-}SiR^2{}_{3-a}X_a \quad (2)$$

wherein $R^2$ and $R^3$ each independently represent an alkyl group having 1 to 20 carbon atoms, an aryl group having 6 to 20 carbon atoms, an aralkyl group having 7 to 20 carbon atoms, or a triorganosiloxy group represented by $(R')_3SiO$— wherein R' represents a hydrocarbon group having 1 to 20 carbon atoms and three R's may be the same or different; when two or more $R^2$s or $R^3$s are present, they may be the same or different; X represents a hydroxyl group or hydrolyzable group; when two or more Xs are present, they may be the same or different; a represents 0, 1, 2 or 3, and b represents 0, 1 or 2, and in the $(SiR^3{}_{2-b}X_bO)$ groups, the number of which is m, bs may be the same or different; m represents an integer of 0 to 19; and provided that the following expression is satisfied: $a+\Sigma b \geq 1$.

The hydrolyzable group is not particularly limited, and may be a hydrolyzable group known in the prior art. Specific examples thereof include hydrogen and halogen atoms, and alkoxy, acyloxy, ketoxymate, amino, amide, acid amide, aminooxy, mercapto, and alkenyloxy groups. Out of these groups, preferred are a hydrogen atom, alkoxy, acyloxy, ketoxymate, amino, amide, aminooxy, mercapto, and alkenyloxy groups. An alkoxy group is particularly preferred since it has a mild hydrolyzability and is easy to handle.

Such a hydrolyzable or hydroxyl group can be bonded in number of 1 to 3 to a single silicon atom. The expression (a+Σb) preferably ranges from 1 to 5. When the hydrolyzable or hydroxyl groups exist in number of 2 or more in the reactive silicon group, they may be the same or different.

The number of the silicon atom(s) constituting the reactive silicon group is 1 or more; when silicon atoms bonded through siloxane bonds or the like are present, the number thereof is preferably 20 or less.

Particularly preferred is a reactive silicon group represented by the following general formula (3):

$$—SiR^2{}_{3-c}X_c \qquad (3)$$

wherein $R^2$ and X are the same as described above, and c is an integer of 1 to 3, since the reactive silicon group is easily available.

Specific examples of $R^2$ and $R^3$ in the general formula (2) or (3) include alkyl groups such as methyl and ethyl groups, cycloalkyl groups such as a cyclohexyl group, aryl groups such as a phenyl group, aralkyl groups such as a benzyl group, and triorganosiloxy groups represented by $(R')_3SiO—$ wherein R' is a methyl or phenyl group, or the like. Out of these groups, a methyl group is particularly preferred.

More specific examples of the reactive silicon group include trimethoxysilyl, triethoxysilyl, triisopropoxysilyl, dimethoxymethylsilyl, diethoxymethylsilyl, and diisopropoxymethylsilyl groups. More preferred are trimethoxysilyl, triethoxysilyl, and dimethoxymethylsilyl groups since they are high in activity so that a good curability can be obtained. Particularly preferred is a trimethoxysilyl group. A dimethoxymethylsilyl group is particularly preferred from the viewpoint of the storage stability thereof. Moreover, triethoxysilyl, and diethoxymethylsilyl groups are particularly preferred since an alcohol generated by a hydrolysis reaction of the reactive silicon groups is ethanol and thus the groups have a higher safety.

It is advisable to introduce a reactive silicon group by a known method. Specifically, examples thereof are the following methods:

(A) An organic polymer having in the molecule a functional group such as a hydroxyl group is caused to react with an organic compound having an active group reactive with this functional group and an unsaturated group to yield an organic polymer having the unsaturated group. Alternatively, it is copolymerized with an unsaturated-group-containing epoxy compound to yield an unsaturated-group-containing organic polymer. Next, a hydrosilane having a reactive silicon group is caused to act on the resultant reaction product, thereby hydrosililating the reaction product.

(B) An unsaturated-group-containing organic polymer obtained in the same manner as in the method (A) is caused to react with a compound having a mercapto group and a reactive silicon group.

(C) An organic polymer having in the molecule a functional group such as a hydroxyl group, epoxy group, or isocyanate group is caused to react with a compound having a functional group reactive with the above-mentioned functional group and a reactive silicon group.

Out of the above-mentioned methods, the method (A), or the method (C) in which a polymer having at a terminal thereof a hydroxyl group is caused to react with a compound having an isocyanate group and a reactive silicon group is preferred since a high conversion ratio is obtained in a relatively short time. The method (A) is particularly preferred since the reactive-silicon-group-having organic polymer obtained by the method (A) becomes a curable composition lower in viscosity and better in workability than the organic polymer obtained by the method (C) and the organic polymer obtained by the method (B) has a strong odor based on mercaptosilane.

Specific examples of the hydrosilane compound used in the method (A) include halogenated silanes such as trichlorosilane, methyldichlorosilane, dimethylchlorosilane, and phenyldichlorosilane; alkoxysilanes such as trimethoxysilane, triethoxysilane, methyldiethoxysilane, methyldimethoxysilane, and phenyldimethoxysilane; acyloxysilanes such as methyldiacetoxysilane, and phenyldiacetoxysilane; and ketoxymate silanes such as bis(dimethylketoxymate)methylsilane, and bis(cyclohexylketoxymate)methylsilane. However, the hydrosilane compound is not limited thereto. Out of these examples, particularly preferred are halogenated silanes, and alkoxysilanes, and the most preferred are alkoxysilanes since the resultant curable composition is mild in hydrolyzability so as to be easily handled. Out of the alkoxysilanes, methyldimethoxysilane is particularly preferred since it is easily available and the resultant organic-polymer-containing curable composition is high in curability, storage stability, elongation characteristic and tensile strength.

The synthesis method (B) is, for example, a method of introducing a compound having a mercapto group and a reactive silicon group into an unsaturated bond moiety of an organic polymer by a radical addition reaction in the presence of a radical initiator and/or a radical generating source. However, the method (B) is not particularly limited. Specific examples of the above-mentioned compound, which has a mercapto group and a reactive silicon group, include γ-mercaptopropyltrimethoxysilane, γ-mercaptopropylmethyldimethoxysilane, γ-mercaptopropyltriethoxysilane, γ-mercaptopropylmethyldiethoxysilane, and mercaptomethyltriethoxysilane. However, the compound is not limited thereto.

The synthesis method (C) in which a polymer having at a terminal thereof a hydroxyl group is caused to react with a compound having an isocyanate group and a reactive silicon group is, for example, a method described in JP-A-3-47825. However, the method is not particularly limited. Specific examples of the above-mentioned compound, which has an isocyanate group and a reactive silicon group, include γ-isocyanatepropyltrimethoxysilane, γ-isocyanatepropylmethyldimethoxysilane, γ-isocyanatepropyltriethoxysilane, and γ-isocyanatepropylmethyldiethoxysilane. However, the compound is not limited thereto.

With the use of any silane compound wherein three hydrolyzable groups are bonded to a single silicon atom, such as trimethoxysilane, a disproportionate reaction thereof may proceed. If the disproportionate reaction proceeds, a considerably dangerous compound such as dimethoxysilane is generated. However, with the use of γ-mercaptopropyltrimethoxysilane or γ-isocyanatepropyltrimethoxysilane, such a disproportionate reaction does not proceed. Therefore, in the case of using, as a silicon-containing group, a silane compound wherein three hydrolyzable groups are bonded to a single silicon atom, such as a trimethoxysilyl group, it is preferred to use the synthesis method (B) or (C).

The organic polymer having a reactive silicon group may be linear or branched. The number-average molecular weight thereof is from about 500 to 100,000, more preferably from 1,000 to 50,000, and in particular preferably from 3,000 to 30,000 in terms of polystyrene in GPC. If the number-average molecular weight is less than 500, an inconvenience tends to be generated about the elongation characteristic of the cured article. If the molecular weight is more than 100,000, the curable composition comes to have a high viscosity so that an inconvenience tends to be generated about the workability.

In order to obtain a rubbery cured article exhibiting a high strength, a high elongation characteristic, and a low elastic modulus, the reactive silicon group(s) contained in the organic polymer should be present in number of at least one, preferably in number of 1.1 to 5 per molecule of the polymer on average. If the number of the reactive silicon group(s) contained in the molecule is less than 1 on average, the curability becomes insufficient so that a good rubber elasticity behavior is not easily expressed. The reactive silicon group(s) may be present at one or plural terminals of the main chain of the organic polymer molecular chain or a terminal of a side chain thereof, or may be present at both of the former terminal(s) and the latter terminal. In particular, when the reactive silicon group(s) is/are present only at the terminal(s) of the main chain of the molecular chain, the effective network length of the organic polymer component contained in the finally-formed cured article becomes long. As a result, a rubbery cured article exhibiting a high strength, a high elongation characteristic and a low elastic modulus comes to be easily obtained.

The above-mentioned polyoxyalkylene polymers are each essentially a polymer having recurring units each represented by the following general formula (4):

$$-R^4-O- \qquad (4)$$

wherein $R^4$ is a linear or branched alkylene group having 1 to 14 carbon atoms. $R^4$ in the general formula (4) is preferably a linear or branched alkylene group having 1 to 14 carbon atoms, preferably 2 to 4 carbon atoms. Specific examples of a recurring unit represented by the general formula (4) include the following:

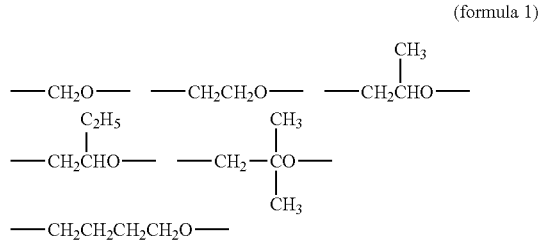

(formula 1)

The main chain skeleton of the polyoxyalkylene polymers may be made of only one recurring unit species, or two or more recurring unit species. In the case of using the curable composition in particular as a sealant, the main chain skeleton is preferably made of polymers made mainly of a propylene oxide polymer since the polymers are amorphous and relatively low in viscosity.

Examples of the method for synthesizing the polyoxyalkylene polymers include a polymerization method by use of an alkali catalyst such as KOH, a polymerization method by use of a transition metal compound/porphyrin complex catalyst, such as a complex obtained by causing an organic aluminum compound to react with porphyrin, as described in JP-A-61-215623, polymerization methods by use of a composite metal cyanide complex catalyst, as described in JP-B-46-27250, JP-B-59-15336, and U.S. Pat. Nos. 3,278,457, 3,278,458, 3,278,459, 3,427,256, 3,427,334, and 3,427,335, a polymerization method by use of a catalyst made of a polyphosphazene salt, an example of which is described in JP-A-10-273512, and a polymerization method by use of a catalyst made of a phosphazene compound, an example of which is described in JP-A-11-060722. However, the method is not particularly limited.

Examples of the method for producing a polyoxyalkylene having a reactive silicon group include methods suggested in JP-B-45-36319, JP-B-46-12154, JP-A-50-156599, JP-A-54-6096, JP-A-55-13767, JP-A-55-13468, JP-A-57-164123, JP-B-3-2450, and U.S. Pat. Nos. 3,632,557, 4,345,053, 4,366,307, and 4,960,844; and polyoxyalkylene polymers which have a high molecular weight and a narrow molecular weight distribution wherein the number-average molecular weight is 6,000 or more and the Mw/Mn is 1.6 or less, suggested in JP-A-61-197631, JP-A-61-215622, JP-A-61-215623, JP-A-61-218632, JP-A-3-72527, JP-A-3-47825, and JP-A-8-231707.

About the above-mentioned reactive-silicon-group-having polyoxyalkylene polymer, a single species thereof may be used alone, or two or more species thereof may be used together.

The saturated hydrocarbon polymers are each a polymer which does not substantially contain a carbon-carbon unsaturated bond other than that in any aromatic ring. A polymer which constitutes the skeleton can be yielded by a method (1) of polymerizing, as a main monomer, an olefin compound having 1 to 6 carbon atoms, such as ethylene, propylene, 1-butene or isobutylene, a method (2) of homopolymerizing a diene compound such as butadiene or isoprene, or copolymerizing a diene compound with the above-mentioned olefin compound and then hydrogenating the resultant copolymer, or some other method. Isobutylene-based polymers or hydrogenated polybutadiene-based polymers are preferred since one or more functional groups can easily be introduced into its terminal(s), the molecular weight can easily be controlled and further the number of the terminal functional group(s) can be made large. Isobutylene-based polymers are particularly preferred.

A substance having a main chain skeleton made of a saturated hydrocarbon polymer is characterized by being excellent in heat resistance, weather resistance, durability, and damp-proof property.

The isobutylene-based polymers may each be a polymer wherein all monomer units are isobutylene units, or a copolymer made from isobutylene and a different monomer. Recurring units each originating from isobutylene are contained in an amount of 50% or more by weight, more preferably 80% or more by weight, and in particular preferably 90 to 99% by weight from the viewpoint of the rubbery property thereof.

As the method for synthesizing the saturated hydrocarbon polymers, various polymerizing methods have been hitherto reported. In recent years, in particular, many of the so-called living polymerizing methods have been developed. A saturated hydrocarbon polymer, in particular, an isobutylene-based polymer can easily be produced by use of an inifer polymerization found out by Kennedy et al. (J. P. Kennedy et al., J. Polymer Sci., Polymer Chem. Ed. 1997, vol. 15, 2843). It is known that a polymer having a molecular weight of about 500 to 100,000 and a molecular weight distribution of 1.5 or less can be obtained by polymerization and various functional groups can be introduced into its molecular terminal(s).

The method for producing the saturated hydrocarbon polymers which have a reactive silicon group are described in, for example, individual specifications of JP-B-4-69659, JP-B-7-108928, JP-A-63-254149, JP-A-64-22904, JP-A-1-197509, Japanese Patent Nos. 2539445 and 2873395, and JP-A-7-53882. However, the method is not particularly limited thereto.

The reactive-silicon-group-having saturated hydrocarbon polymers may be used alone or in combination of two or more thereof.

The (meth) acrylic acid ester monomer which constitutes the main chain of the above-mentioned (meth) acrylic acid ester polymers is not particularly limited, and various monomers can be used. Examples thereof include (meth)acrylic acid, methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-pentyl (meth)acrylate, n-hexyl (meth)acrylate, cyclohexyl (meth)acrylate, n-heptyl (meth)acrylate, n-octyl (meth)acrylate, 2-ethylhexyl (meth)acrylate, nonyl (meth)acrylate, decyl (meth)acrylate, dodecyl (meth)acrylate, phenyl (meth)acrylate, toluoyl (meth)acrylate, benzyl (meth)acrylate, 2-methoxyethyl (meth)acrylate, 3-methoxybutyl (meth)acrylate, 2-hydroxyethyl (meth)acrylate, 2-hydroxypropyl (meth)acrylate, stearyl (meth)acrylate, glycidyl (meth)acrylate, 2-aminoethyl (meth)acrylate, γ-(methacryloyloxypropyl)trimethoxysilane, γ-(methacryloyloxypropyl)dimethoxymethylsilane, an ethylene oxide adduct of (meth)acrylic acid, trifluoromethylmethyl (meth)acrylate, 2-trifluoromethylethyl (meth)acrylate, 2-perfluoroethylethyl (meth)acrylate, 2-perfluoroethyl-2-perfluorobutylethyl (meth)acrylate, perfluoroethyl (meth)acrylate, trifluoromethyl (meth)acrylate, bis(trifluoromethyl)methyl (meth)acrylate, trifluoromethylperfluoroethylmethyl (meth)acrylate, 2-perfluorohexylethyl (meth)acrylate, 2-perfluorodecylethyl (meth)acrylate, 2-perfluorohexadecylethyl (meth)acrylate, and other (meth)acrylic acid ester monomers.

In the above-mentioned (meth) acrylic acid ester polymers, any (meth) acrylic acid ester monomer can be copolymerized with a vinyl monomer described below. Examples of the vinyl monomer include styrene-based monomers such as styrene, vinyltoluene, α-methylstyrene, chlorostyrene, styrenesulfonic acid, and salts thereof; fluorine-containing vinyl monomers such as perfluoroethylene, perfluoropropylene, and vinylidene fluoride; silicon-containing vinyl monomers such as vinyltrimethoxysilane, and vinyltriethoxysilane; maleic anhydride, maleic acid, and monoalkyl esters and dialkyl esters of maleic acid; fumaric acid, and monoalkyl esters and dialkyl esters of fumaric acid; maleimide-based monomers such as maleimide, methylmaleimide, ethylmaleimide, propylmaleimide, butylmaleimide, hexylmaleimide, octylmaleimide, dodecylmaleimide, stearylmaleimide, phenylmaleimide, and cyclohexylmaleimide; nitrile-group-containing vinyl monomers such as acrylonitrile, and methacrylonitrile; amide-group-containing vinyl monomers such as acrylamide, and methacrylamide; vinyl esters such as vinyl acetate, vinyl propionate, vinyl pivalate, vinyl benzoate, and vinyl cinnamate; alkenes such as ethylene and propylene; conjugated dienes such as butadiene and isoprene; and vinyl chloride, vinylidene chloride, allyl chloride, and allyl alcohol.

These may be used alone, or plural ones thereof may be copolymerized with each other. In particular, a polymer made from a styrene-based monomer and a (meth)acrylic acid-based monomer is preferred from the viewpoint of physical property of the product. More preferred is a (meth) acrylic polymer made from an acrylic acid ester monomer and a (meth)acrylic acid ester monomer, and particularly preferred is an acrylic polymer made from an acrylic acid ester monomer. For ordinary buildings, a butyl acrylate monomer is more preferred since the composition is required to have a low viscosity and the cured article is required to have a low modulus, a high elongation characteristic, weather resistance, heat resistance, and other physical properties. For articles that are required to have oil resistance and others, such as automobiles, a copolymer made mainly of ethyl acrylate is more preferred. This polymer made mainly of ethyl acrylate tends to be excellent in oil resistance, but be slightly poor in low temperature property (cold resistance); therefore, in order to improve the low temperature property, a part of ethyl acrylate may be replaced by butyl acrylate. However, as the ratio of butyl acrylate is made larger, a good oil resistance thereof is impaired accordingly. Thus, for articles which are required to have oil resistance, the ratio is preferably 40% or less, more preferably 30% or less. In order to improve the low temperature property and others without damaging the oil resistance, it is also preferred to use 2-methoxyethyl acrylate, 2-ethoxyethyl acrylate, or the like, wherein oxygen is introduced in an alkyl group of a side chain. However, the introduction of the alkoxy group, which has an ether bond, into the side chain tends to make the heat resistance poor; therefore, when heat resistance is required, the ratio is preferably set to 40% or less. In accordance with various articles or required purposes, the ratio is varied considering required oil resistance, heat resistance, and physical properties such as low temperature property, whereby an appropriate polymer can be obtained. The polymer is not restricted, and an example thereof excellent in the balance between physical properties such as oil resistance, heat resistance, and low temperature property is a copolymer of ethyl acrylate/butyl acrylate/2-methoxyethyl acrylate (ratio by weight of 40-50/20-30/30-20). In the invention, these preferred monomers may be copolymerized with a different monomer, or block-copolymerized therewith. At this time, these preferred monomers are preferably contained at a ratio by weight of 40% or more. (Meth)acrylic acid in the above-mentioned expression format represents acrylic acid and/or methacrylic acid.

The method for synthesizing the (meth)acrylate acid ester polymers is not particularly limited, may be a known method. However, any polymer obtained by an ordinary free-radical polymerization method, wherein an azo compound, a peroxide or the like is used as a polymerization initiator, has a problem that the value of the molecular weight distribution is generally as large as 2 or more so as to give a large viscosity. Accordingly, in order to obtain a (meth)acrylic acid ester polymer having a narrow molecular weight distribution and a low viscosity and having, at its molecular chain terminal, a crosslinkable functional group at a high ratio, it is preferred to use living radical polymerization methods.

Out of the "living radical polymerization methods", an "atom transfer radical polymerization method", wherein an organic halide or a halogenated sulfonyl compound is used as a initiator and a transition metal complex is used as a catalyst to polymerize a (meth)acrylic acid ester monomer, is more preferred as a method for producing a (meth) acrylic acid ester polymer having a specific functional group since the method has characteristics of the above-mentioned "living radical polymerization method", a halogen or the like, which is relatively advantageous for functional group converting reaction, is generated at the terminal, the flexibility of the design of the initiator or the catalyst is large. This atom transfer radical polymerization method is described in, for example, Matyjaszewski et al., Journal of American Chemical Society (J. Am. Chem. Soc.) 1995, vol. 117, p. 5614.

As the process for producing a (meth)acrylic acid ester polymer having a reactive silicon group, for example, the following are disclosed: production processes using a free radical polymerization method using a chain transfer agent in JP-B-3-14068, JP-B-4-55444, and JP-A-6-211922. Moreover, in JP-A-9-272714 or the like, a production process using an atom transfer radical polymerization method is disclosed. However, the above-mentioned process is not particularly limited thereto.

About the reactive-silicon-group-having (meth)acrylic acid ester polymer, a single species thereof may be used alone, or two or more species thereof may be used together.

These reactive-silicon-group-having organic polymers may be used alone or in combination of two or more thereof. Specifically, it is allowable to use an organic polymer obtained by blending two or more selected from the group consisting of a reactive-silicon-group-having polyoxyalkylene polymer, a reactive-silicon-group-having saturated hydrocarbon polymer, and a reactive-silicon-group-having (meth) acrylic acid ester polymer.

The method for producing an organic polymer obtained by blending a reactive-silicon-group-having polyoxyalkylene polymer with a reactive-silicon-group-having (meth)acrylic acid ester polymer is suggested in JP-A-59-122541, JP-A-63-112642, JP-A-6-172631, JP-A-11-116763, and others. However, the method is not particularly limited thereto. A preferred specific example thereof is a method of blending a reactive-silicon-group-having polyoxyalkylene polymer with a copolymer which has a reactive silicon group and has a molecular chain made substantially of: (meth) acrylic acid ester monomer units each having an alkyl group having 1 to 8 carbon atoms and represented by the following general formula (5):

$$-CH_2-C(R^5)(COOR^6)- \quad (5)$$

wherein $R^5$ represents a hydrogen atom or a methyl group, and $R^6$ represents the alkyl group having 1 to 8 carbon atoms; and (meth) acrylic acid ester monomer units each having an alkyl group having 10 or more carbon atoms and represented by the following general formula (6):

$$-CH_2-C(R^5)(COOR^7)- \quad (6)$$

wherein $R^5$ is the same as described above, and $R^7$ represents the alkyl group having 10 or more carbon atoms.

$R^6$ in the general formula (5) is an alkyl group having 1 to 8 carbon atoms, preferably 1 to 4 carbon atoms, more preferably 1 or 2 carbon atoms, such as a methyl, ethyl, propyl, n-butyl, t-butyl, or 2-ethylhexyl group. Alkyl groups as $R^6$s may be of a single species or two or more mixed species.

$R^7$ in the general formula (6) is a long-chain alkyl group having 10 or more carbon atoms, usually 10 to 30 carbon atoms, preferably 10 to 20 carbon atoms, such as a lauryl, tridecyl, cetyl, stearyl or behenyl group. In the same manner as $R^6$s, alkyl groups as $R^7$s may be of a single species or two or more mixed species.

The molecular chain of the (meth)acrylic acid ester copolymer is made substantially of the monomer units of the formulae (5) and (6). The word "substantially" herein means that the total ratio of the monomer units of the formulae (5) and (6) present in the copolymer exceeds 50% by weight. The total ratio of the monomer units of the formulae (5) and (6) is preferably 70% by weight or more.

The presence ratio by weight of the monomer units of the formula (5) to the monomer units of the formula (6) is preferably from 95/5 to 40/60, more preferably from 90/10 to 60/40.

Examples of a monomer unit which may be contained in the copolymer other than the formulae (5) and (6) include acrylic acids such as acrylic acid and methacrylic acid; amide groups such as acrylamide, methacrylamide, N-methylolacrylamide, and N-methylolmethacrylamide; epoxy groups such as glycidyl acrylate, and glycidyl methacrylate; amino-group-containing monomers such as diethylaminoethyl acrylate, diethylaminoethyl methacrylate, and aminoethyl vinyl ether; and a monomer unit originating from acrylonitrile, styrene, α-methylstyrene, alkyl vinyl ether, vinyl chloride, vinyl acetate, vinyl propionate, ethylene or the like.

An organic polymer obtained by blending a reactive-silicon-group-having saturated hydrocarbon polymer with a reactive-silicon-group-having (meth) acrylic acid ester copolymer is suggested in JP-A-1-168764, JP-A-2000-186176, and others. The organic polymer is not particularly limited thereto.

As the process for producing an organic polymer into which a reactive-silicon-functional-group-having (meth) acrylic acid ester copolymer is incorporated, a method of polymerizing a (meth)acrylic acid ester monomer in the presence of a reactive-silicon-group-having organic polymer can also be used. This production process is specifically disclosed in JP-A-59-78223, JP-A-59-168014, JP-A-60-228516, JP-A-60-228517, and others. However, the production process is not limited thereto.

In the meantime, a different component such as a urethane bonding component may be contained in the main chain skeleton of the organic polymer as long as the advantageous effects of the invention are not largely impaired.

The urethane bonding component is not particularly limited, and may be a group generated by reaction between an isocyanate group and an active hydrogen radical (hereinafter referred to as an amide segment).

The amide segment is a group represented by the following general formula (7):

$$-NR^8-C(=O)- \quad (7)$$

wherein $R^8$ represents a hydrogen atom or a substituted or unsubstituted organic group.

Specific examples of the amide segment include a urethane group generated by reaction between an isocyanate group and a hydroxyl group; a urea group generated between an isocyanate group and an amino group; and a thiourethane group generated between an isocyanate group and a mercapto group. In the invention, groups generated by causing an active hydrogen in the urethane group, urea group, and thiourethane group to react further with an isocyanate group are also included in the category of the group of the general formula (7).

An example of an industrially advantageous production process of an organic polymer having an amide segment and a reactive silicon group is a product produced by a method of causing an excessive amount of a polyisocyanate compound to react with an organic polymer having an active-hydrogen-containing group at its terminal to yield polymers having isocyanate groups at their polyurethane main chain terminals, and subsequently or simultaneously causing the whole or a part of the isocyanate groups to react with a W group of a silicon compound represented by the following general formula (8):

$$W-R^9-SiR^2_{3-c}X_c \quad (8)$$

wherein $R^2$, X and c are the same as described above; $R^9$ is a bivalent organic group, more preferably a substituted or unsubstituted bivalent hydrocarbon group having 1 to 20 carbon atoms; W is an active-hydrogen-containing group selected from a hydroxyl group, a carboxyl group, a mercapto group, and a (unsubstituted or mono-substituted) amino group. Known organic-polymer-producing processes related to this production process are exemplified in JP-B-46-12154 (U.S. Pat. No. 3,632,557), JP-A-58-109529 (U.S. Pat. No. 4,374,237), JP-A-62-13430 (U.S. Pat. No. 4,645,816), JP-A-8-53528 (EP 0676403), JP-A-10-204144 (EP 0831108), JP-A-2003-508561 (Japanese Patent Application National Publication) (U.S. Pat. No. 6,197,912), JP-A-6-211879 (U.S. Pat. No. 5,364,955), JP-A-10-53637 (U.S. Pat. No. 5,756,751), JP-A-11-100427, JP-A-2000-169544, JP-A-2000-169545, JP-A-2002-212415, Japanese Patent No. 3313360, U.S. Pat. Nos. 4,067,844 and 3,711,445, JP-A-2001-323040, and others.

Another examples of the above is a product produced by causing an organic polymer having an active-hydrogen-containing group at its terminal to react with a reactive-silicon-group-containing isocyanate compound represented by the following general formula (9):

$$O=C=N-R^9-SiR^2_{3-c}X_c \qquad (9)$$

wherein $R^2$, $R^9$, X and c are the same as described above. Known organic-polymer-producing processes related to this production process are exemplified in JP-A-11-279249 (U.S. Pat. No. 5,990,257), JP-A-2000-119365 (U.S. Pat. No. 6,046,270), JP-A-58-29818 (U.S. Pat. No. 4,345,053), JP-A-3-47825 (U.S. Pat. No. 5,068,304), JP-A-11-60724, JP-A-2002-155145, JP-A-2002-249538, WO 03/018658, WO 03/059981, and others.

Examples of the organic polymer having an active-hydrogen-containing group at its terminal include an oxyalkylene polymer having a hydroxyl group at its terminal (polyetherpolyol), polyacrylpolyol, polyesterpolyol, a saturated hydrocarbon polymer having a hydroxyl group at its terminal (polyolefinpolyol), a polythiol compound, and a polyamine compound. Out of these, a polyetherpolyol, a polyacrylpolyol, and a polyolefinpolyol are preferred since the glass transition temperature of the resultant organic polymer is relatively low and the resultant cured article is excellent in cold resistance. Especially, a polyetherpolyol is particularly preferred since the resultant organic polymer is low in viscosity so as to be good in workability and the depth curability is good. Moreover, a polyacrylpolyol and a saturated hydrocarbon polymer are more preferred since the cured article of the resultant organic polymer is good in weather resistance and heat resistance.

As the polyetherpolyol, a polyetherpolyol produced by any production process can be used. Preferred is a polyetherpolyol having hydroxyl group(s) the number of which is at least 0.7 at its terminal per molecular terminal on the average of all molecules thereof. Specific examples thereof include an oxyalkylene polymer produced by use of a conventional alkali metal catalyst, and an oxyalkylene polymer produced by causing an alkylene oxide to react with an initiator such as a polyhydroxy compound having at least 2 hydroxyl groups in the presence of a composite metal cyanide complex, or cesium.

Out of the above-mentioned individual polymerization methods, the method using a composite metal cyanide complex is preferred since it is possible to yield an oxyalkylene polymer having a lower unsaturation degree, a narrow Mw/Mn, a lower viscosity, a high acidity resistance and a high weather resistance.

The polyacrylpolyol may be a polyol having, as a skeleton, an alkyl (meth)acrylate (co)polymer and having, in the molecule thereof, a hydroxyl group. The method for synthesizing this polymer is preferably a living radical polymerization method since the molecular weight distribution can be made narrow and the viscosity can be made low. The method is more preferably an atom transfer radical polymerization method. It is also preferred to use a polymer produced through the so-called SGO process, which is obtained by subjecting an alkyl acrylate monomer described in JP-A-2001-207157 to continuous bulk polymerization at a high temperature and a high pressure. A specific example thereof is ARUFON UH-2000 manufactured by Toagosei Co., Ltd.

Specific examples of the polyisocyanate compound include aromatic polyisocyanates such as toluene(tolylene) diisocyanate, diphenylmethanediisocyanate, and xylylenediisocyanate; and aliphatic polyisocyanates such as isophoronediisocyanate, and hexamethylenediisocyanate.

The silicon compound of the general formula (8) is not particularly limited, and specific examples thereof include amino-containing silanes such as γ-aminopropyltrimethoxysilane, N-(β-aminoethyl)-γ-aminopropyltrimethoxysilane, γ-(N-phenyl)aminopropyltrimethoxysilane, N-ethylaminoisobutyltrimethoxysilane, N-cyclohexylaminomethyltriethoxysilane, N-cyclohexylaminomethyldiethoxymethylsilane, and N-phenylaminomethyltrimethoxysilane; hydroxy-group-containing silanes such as γ-hydroxypropyltrimethoxysilane; and mercapto-group-containing silanes such as γ-mercaptopropyltrimethoxysilane. As described in JP-A-6-211879 (U.S. Pat. No. 5,364,955), JP-A-10-53637 (U.S. Pat. No. 5,756,751), JP-A-10-204144 (EP 0831108), JP-A-2000-169544, and JP-A-2000-169545, it is possible to use, as the silicon compound of the general formula (8), a Michael addition reaction product made from one out of various α, β-unsaturated carbonyl compounds and a primary-amino-group-containing silane, or a Michael addition reaction product made from one out of various (meth)acryloyl-group-containing silane and a primary-amino-group-containing compound.

The reactive-silicon-group-containing isocyanate compound of the general formula (9) is not particularly limited, and specific examples thereof include γ-trimethoxysilylpropylisocyanate, γ-triethoxysilylpropylisocyanate, γ-methyldimethoxysilylpropylisocyanate, γ-methyldiethoxysilylpropylisocyanate, trimethoxysilylmethylisocyanate, and dimethoxymethylsilylmethylisocyanate. As described in JP-A-2000-119365 (U.S. Pat. No. 6,046,270), a compound obtained by causing the silicon compound of the general formula (8) to react with an excessive amount of the above-mentioned polyisocyanate compound can also be used as the reactive-silicon-group-containing isocyanate compound of the general formula (9).

When the amount of the amide segment is large in the main chain skeleton of the organic polymer which is the component (A) in the invention, the organic polymer may become high in viscosity to give a composition poor in workability. On the other hand, by the amide segment in the main chain skeleton of the component (A), the curability of the composition of the invention tends to be improved. Accordingly, when the organic polymer having, in its main chain skeleton, an amide segment is used as the component (A), a composition wherein the component (A) is combined with the component (B) is preferred since the composition has a more rapid curability in spite of using an organotin-free catalyst. When one or more amide segments are contained in the main chain skeleton of the component (A), the number of the amide segment(s) is preferably from 1 to 10, more preferably from 1.5 to 7, in particular preferably from 2 to 5 per molecule. If the number is less than 1, the curability may not be sufficient. If the number is more than 10, the organic polymer may become high in viscosity to give a composition poor in workability.

In the invention, a bivalent tin carboxylate is used as the component (B). The component (B) in the invention functions as the so-called silanol condensing catalyst, which is capable of forming a siloxane bond from the hydroxyl or hydrolyzable group bonded to the silicon atom contained in the organic polymer of the component (A). As compared with other silanol condensing catalysts, the component (B) makes it possible to heighten the restorability, the durability and the creep resistance of the resultant cured article.

The bivalent tin carboxylate (B) is preferred as an organotin-free catalyst since a burden thereof to the environment is small. In the invention, dibutyltin dilaurate, dibutyltin diacetate and so on are classified into organotin compounds, and are not contained in the category of the bivalent tin carboxylate (B).

Specific examples of a carboxylic acid having the acid group of the bivalent tin carboxylate (B) include linear saturated aliphatic acids such as acetic acid, propionic acid, butyric acid, valeric acid, caproic acid, enanthic acid, caprylic acid, 2-ethylhexenolic acid, pelargonic acid, capric acid, undecanoic acid, lauric acid, tridecylic acid, myristic acid, pentadecylic acid, palmitic acid, heptadecylic acid, stearic acid, nonadecanoic acid, arachic acid, behenic acid, lignoceric acid, cerotic acid, montanoic acid, melissic acid, and lacceric acid; monoene unsaturated aliphatic acids such as undecylenic acid, linderic acid, tsuzuic acid, fizeterin acid, myristoleic acid, 2-hexadecenoic acid, 6-hexadecenoic acid, 7-hexadecenoic acid, palmitoleic acid, petroselinic acid, oleic acid, elaidic acid, asclepinic acid, vaccenic acid, gadoleic acid, gondoic acid, cetoleic acid, erucic acid, brassidicacid, selacholeicacid, ximenicacid, lumequeicacid, acrylic acid, methacrylic acid, angelic acid, crotonic acid, isocrotonic acid, and 10-undecenoic acid; polyene unsaturated aliphatic acids such as linoelaidic acid, linoleic acid, 10,12-octadecadienoic acid, hiragonic acid, α-eleostearic acid, β-eleostearic acid, punicic acid, linolenic acid, 8,11,14-eicosatrienoic acid, 7,10,13-docasatrienoic acid, 4,8,11,14-hexadecatetraenoic acid, moroctic acid, stearidonic acid, arachidonic acid, 8,12,16,19-docosatetraenoic acid, 4,8,12,15,18-eicosapentaenoic acid, clupanodonic acid, nisinic acid, and docasahexaenoic acid; branched aliphatic acids such as 1-methylbutyric acid, isobutyric acid, 2-ethylbutyric acid, isovaleric acid, tuberculostearic acid, pivalic acid, 2,2-dimethylbutyric acid, 2-ethyl-2-methylbutyric acid, 2,2-diethylbutyric acid, 2,2-dimethylvaleric acid, 2-ethyl-2-methylvaleric acid, 2,2-diethylvaleric acid, 2,2-dimethylhexanoic acid, 2,2-diethylhexanoic acid, 2,2-dimethyloctanoic acid, 2-ethyl-2,5-dimethylhexanoic acid, neodecanoic acid, and versatic acid; triple-bond-containing aliphatic acids such as propiolic acid, tariric acid, stearolic acid, crepenynic acid, xymenynic acid, and 7-hexadecynoic acid, alicyclic carboxylic acids such as naphthenoic acid, malvalic acid, sterculic acid, hydronocarpic acid, chaulmoogric acid, gorlic acid, 1-methylcyclopentanecarboxylic acid, 1-methylcyclohexanecarboxylic acid, 2-methylbicyclo[2.2.1]-5-heptene-2-carboxylic acid, 1-adamantanecarboxylic acid, bicyclo[2.2.1]heptane-1-carboxylic acid, and bicyclo[2.2.2]octane-1-carboxylic acid; oxygen-containing aliphatic acids such as acetoacetic acid, ethoxyacetic acid, glyoxylic acid, glucolic acid, gluconic acid, sabinic acid, 2-hydroxytetradecanoic acid, iprolic acid, 2,2-dimethyl-3-hydroxypropionic acid, 2-hydroxyhexadecanoic acid, julapinolic acid, juniperic acid, ambrettolic acid, alueritic acid, 2-hydroxyoctadecanoic acid, 12-hydroxyoctadecanoic acid, 18-hydroxyoctadecanoic acid, 9,10-dihydroxyoctadecanoic acid, ricinoleic acid, kamlolenic acid, licanic acid, ferronic acid, cerebronic acid. 2-methyl-7-oxabicyclo[2.2.1]-5-heptene-2-carboxylic acid; and halogen-substituted monocarboxylic acids such as chloroacetic acid, 2-chloroacrylic acic, and chlorobenzoic acid. Examples of an aliphatic dicarboxylic acid include saturated dicarboxylic acids such as adipic acid, azelaic acid, pimelic acid, suberic acid, sebacic acid, ethylmalonic acid, glutaric acid, oxalic acid, malonic acid, succinic acid, oxydiacetic acid, dimethylmalonic acid, ethylmethylmalonic acid, diethylmalonic acid, 2,2-dimethylsuccinic acid, 2,2-diethylsuccinic acid, 2,2-dimethylglutaric acid, and 1,2,2-trimethyl-1,3-cyclopentanedicarboxylic acid; and unsaturated dicarboxylic acids such as maleic acid, fumaric acid, acetylene dicarboxylic acid, and itaconic acid. Examples of an aliphatic polycarboxylic acid include tricarboxylic acids such as aconitic acid, 4,4-dimethylaconitic acid, citric acid, isocitric acid, and 3-methylisocitric acid. Examples of an aromatic carboxylic acid include benzoic acid, 9-anthracenecarboxylic acid, atrolactinic acid, anisic acid, isopropylbenzoic acid, salicylic acid, and toluic acid; and aromatic polycarboxylic acids such as phthalic acid, isophthalic acid, terephthalic acid, carboxyphenylacetic acid, and pyromellitic acid.

Out of these, tin salts of monocarboxylic acids are more preferred and tin salts of linear monocarboxylic acids are even more preferred since they are good in compatibility with the component (A).

If the carboxylic acid having the acid group of the component (B) has a high melting point (high crystallinity), a tin salt thereof is also difficult to handle (poor in workability). Accordingly, the melting point of the carboxylic acid having the acid group of the component (B) is preferably 65° C. or lower, more preferably from −50 to 50° C., and in particular preferably from −40 to 35° C.

The carboxylic acid having the acid group of the component (B) has preferably 5 to 20 carbon atoms, more preferably 6 to 18 carbon atoms, and in particular preferably 8 to 12 carbon atoms. If the number of the carbon atoms is larger than this range, the acid easily turns into a solid state so as not to be easily compatible with the component (A). Thus, the acid tends to come not to give activity. On the other hand, if the number of the carbon atoms is smaller, the volatility of the carboxylic acid becomes high. As a result, a bad smell tends to be increased by the carboxylic acid released from the component (B).

As described above, preferred are tin 2-ethylhexanoate, tin 2,2-dimethyloctanoate, tin 2-ethyl-2,5-dimethylhexanoate, tin octylate, tin neodecanoate, tin versatate, tin oleate, tin naphthenate and so on from the viewpoint of availability and workability.

In particular, tin carboxylates wherein the carbon atom adjacent to its carbonyl group is tertiary or quaternary, such as tin 2-ethylhexanoate, tin 2,2-dimethyloctanoate, tin 2-ethyl-2,5-dimethylhexanoate, tin neodecanoate and tin versatate, are preferred since they tend to exhibit a high catalyst activity.

About the bivalent tin carboxylate, a single species thereof may be used alone or two or more species thereof may be used together.

The use amount of the component (B) is preferably from about 0.1 to 20 parts by weight, more preferably from about 1 to 10 parts by weight with respect to of the component (A). If the blend amount of the component (B) is less than 0.1 part by weight, the curing speed may become small and the catalyst activity may lower after the composition is stored. On the other hand, if the blend amount of the component (B) is more than 20 parts by weight, the time when the composition can be used becomes too short so that the workability may deteriorate.

In the invention, an amine compound having no reactive silicon group is used as the component (C). The addition of the component (C) causes an improvement in the curability.

Specific examples of the amine compound having no reactive silicon group as the component (C) include aliphatic primary amines such as methylamine, ethylamine, propylamine, isopropylamine, butylamine, amylamine, hexylamine, octylamine, 2-ethylhexylamine, nonylamine, decylamine, laurylamine, pentadecylamine, cetylamine, stearylamine, and cyclohexylamine; alipathic secondary amines such as dimethylamine, diethylamine, dipropylamine, diisopropylamine, dibutylamine, diamylamine, dihexylamine, dioctylamine, di(2-ethylhexyl)amine, didecylamine, dilaurylamine, dicetylamine, distearylamine, methylstearylamine, ethylstearylamine, and butylstearylamine; aliphatic tertiary amines such as triamylamine, trihexylamine, and trioctylamine; aliphatic unsaturated amines such as triallylamine, and oleylamine; aromatic amines such as laurylaniline, stearylaniline, and triphenylamine; and other amines such as monoethanolamine, diethanolamine, triethanolamine, 3-hydroxypropylamine, diethylenetriamine, triethylenetetramine, benzylamine, 3-methoxypropylamine, 3-lauryloxypropylamine, 3-dimethylaminopropylamine, 3-diethylaminopropylamine, xylylenediamine, ethylenediamine, hexamethylenediamine, triethylenediamine, guanidine, diphenylguanidine, 2,4,6-tris(dimethylaminomethyl)phenol, morpholine, N-methylmorpholine, 2-ethyl-4-methylimidazole, 1,8-diazabicyclo(5,4,0)undecene-7 (DBU), and 1,5-diazabicyclo(4,3,0)nonene-5 (DBN). The amine compound is not limited thereto.

A ketimine can also be used as the component (C). Ketimine is stably present in the absence of any water, and is decomposed into a primary amine and a ketone by water. Such a ketimine can be obtained by a condensing reaction between an amine compound and a carbonyl compound.

To synthesize the ketimine, it is advisable to use a known amine compound and a known carbonyl compound. For example, the following can be used as the amine compound: a diamine such as ethylenediamine, propylenediamine, trimethylenediamine, tetramethylenediamine, 1,3-diaminobutane, 2,3-diaminobutane, pentamethylenediamine, 2,4-diaminopentane, hexamethylenediamine, p-phenylenediamine, or p,p'-biphenylenediamine; a polyhydric amine such as 1,2,3-triaminopropane, triaminobenzene, tris(2-aminoethyl)amine, or tetra(aminomethyl)methane; a polyalkylenepolyamine such as diethylenetriamine, triethylenetriamine, or tetraethylenepentamine; a polyoxyalkylene-based polyamine; or an aminosilane such as γ-aminopropyltriethoxysilane, N-(β-aminoethyl)-γ-aminopropyltrimethoxysilane, or N-(β-aminoethyl)-γ-aminopropylmethyldimethoxysilane. As the carbonyl compound, the following can be used: an aldehyde such as acetoaldehyde, propionaldehyde, n-butylaldehyde, isobutylaldehyde, diethylacetoaldehyde, glyoxal, or benzaldehyde; a cyclic ketone such as cyclopentanone, trimethylcyclopentanone, cyclohexanone, or trimethylcyclohexanone; an aliphatic ketone such as acetone, methyl ethyl ketone, methyl propyl ketone, methyl isopropyl ketone, methyl isobutyl ketone, diethyl ketone, dipropyl ketone, diisopropyl ketone, dibutyl ketone, or diisobutyl ketone; a β-dicarbonyl compound such as acetylacetone, methyl acetoacetate, ethyl acetoacetate, dimethyl malonate, diethyl malonate, methylethyl malonate, or dibenzoylmethane; or the like.

When an imino group is present in the ketimine, the imino group may be caused to react with styrene oxide, a glycidyl ether such as butyl glycidyl ether or allyl glycidyl ether, a glycidyl ester, or the like. The above-mentioned ketimines may be used alone or may be used in combination of two or more thereof. The ketimines may each be used together with the above-mentioned amine compound.

These components (C) have largely different co-catalytic powers in accordance with the structure of the components (C) themselves, the compatibility with the component (A), and others. Thus, it is preferred to select an appropriate compound in accordance with the kind of the used component (A). In the case of using, as the component (A), for example, a polyoxyalkylene polymer, preferred is a primary amine such as octylamine or laurylamine since the co-catalytic power thereof is high. Preferred is also an amine compound having a hydrocarbon group having at least one heteroatom. The heteroatom referred to herein may be N, O, S or the like, but is not limited thereto. Examples of such an amine compound include the compounds exemplified as the above-mentioned other amines. Out of the examples, more preferred is an amine compound having a hydrocarbon group having a heteroatom on the carbon atom at the 2- or 4-position thereof. Examples of such an amine compound include etylenediamine, ethanolamine, dimethylaminoethylamine, diethylaminoethylamine, 3-hydroxypropylamine, diethylenetriamine, 3-methoxypropylamine, 3-lauryloxypropylamine, N-methyl-1,3-propanediamine, N,N-dimethyl-1,3-propanediamine, N,N-diethyl-1,3-propanediamine, 3-(1-piperazinyl)propylamine, and 3-morpholinopropylamine. Out of these, N,N-diethyl-1,3-propanediamine, N-methyl-1,3-propanediamine, and 3-morpholinopropylamine are more preferred since the co-catalytic power thereof is high. In the case of using an isobutylene-based polymer as the component (A), preferred is a relatively long chain aliphatic secondary amine, such as dioctylamine or distearylamine, or an aliphatic secondary amine, such as dicyclohexylamine, since the amine is high in co-catalytic power.

The blend amount of the amine compound which is the component (C) is preferably from about 0.01 to 20 parts by weight, more preferably from 0.1 to 5 parts by weight with respect to of the organic polymer of the component (A). If the blend amount of the amine compound is less than 0.01 part by weight, a sufficient curing speed may not be obtained and further the curing reaction does not proceed sufficiently with ease. On the other hand, if the blend amount of the amine compound is more than 20 parts by weight, the pot life is too short so that the workability is poor and the adhesiveness onto a substrate tends to lower. Moreover, the curing speed may be reversely small.

Silica may be incorporated as a component (D) in the present invention. Examples of the silica include fine powdery silicas such as fumed silica (aerosol silica), and Aerosil. Particularly preferred is fine powdery silica having a specific surface area (based on the BET absorption method) of 50 to 400 $m^2/g$ or more, preferably about 100 to 300 $m^2/g$. It is preferred to make the particle diameter of the silica as small as possible. When the particle diameter of the silica is smaller than the wavelengths of visible rays, the present curable composition or cured articles appears to be transparent even if the silica is dispersed in the composition or the article.

As for the silica, preferred is silica subjected to treatment with an organic silicon compound such as dimethyldichlorosilane, hexamethyldisilazane, dimethylsiloxane, or trimethoxyoctylsilane, thereby gaining hydrophobicity. The silane treated to gain hydrophobicity is excellent in compatibility with the reactive-silicon-group-having organic polymer (A), and particles of the silica do not aggregate easily. Thus, the state that the silica is stably dispersed in the present curable composition can be kept. This is distributed as commercial products, and is easily available. Examples thereof include AEROSIL manufactured by Nippon Aerosil Co., Ltd., and Sylophobic manufactured by Fuji Silysia Chemical Ltd.

The use amount of the silica is from 1 to 250 parts by weight, preferably from 10 to 200 parts by weight with respect to of the polymer of the component (A). If the blend amount of the silica is less than 1 part by weight, the effect of reinforcing the cured article is not expressed and an effect of giving thixotropy is not unfavorably expressed. On the other hand, if the blend amount is more than 200 parts by weight, the composition comes to have a high viscosity before cured, so as to exhibit a bad workability. Of course, about the silica, only one species thereof may be used, or two or more species may be used in a mixture form.

In the curable composition or cured articles of the invention, a known silane coupling agent may be used to keep the adhesiveness to a substrate certainly. Aminosilane or epoxysilane is known as a silane coupling agent having an adhesiveness-imparting effect.

Specific examples of the aminosilane include amino-group-containing silanes such as γ-aminopropyltrimethoxysilane, γ-aminopropyltriethoxysilane, γ-aminopropyltriisopropoxysilane, γ-aminopropylmethyldimethoxysilane, γ-aminopropylmethyldiethoxysilane, γ-(2-aminoethyl)aminopropyltrimethoxysilane, γ-(2-aminoethyl)aminopropylmethyldimethoxysilane, γ-(2-aminoethyl)aminopropyltriethoxysilane, γ-(2-aminoethyl)aminopropylmethyldiethoxysilane, γ-(2-aminoethyl)aminopropyltriisopropoxysilane, γ-(2-(2-aminoethyl)aminoethyl)aminopropyltrimethoxysilane, γ-(6-aminohexyl)aminopropyltrimethoxysilane, 3-(N-ethylamino)-2-methylpropyltrimethoxysilane, γ-ureidopropyltrimethoxysilane, γ-ureidopropyltriethoxysilane, N-phenyl-γ-aminopropyltrimethoxysilane, N-benzyl-γ-aminopropyltrimethoxysilane, N-vinylbenzyl-γ-aminopropyltriethoxysilane, N-cyclohexylaminomethyltriethoxysilane, N-cyclohexylaminomethyldiethoxymethylsilane, N-phenylaminomethyltrimethoxysilane, (2-aminoethyl)aminomethyltrimethoxysilane, N,N'-bis[3-(trimethoxysilyl)propyl]ethylenediamine; and ketimine type silanes such as N-(1,3-dimethylbutylidene)-3-(triethoxysilyl)-1-propaneamine.

Out of these, preferred are γ-aminopropyltrimethoxysilane, γ-(2-aminoethyl)aminopropyltrimethoxysilane, and γ-(2-aminoethyl)aminopropylmethyldimethoxysilane in order to keep a good adhesiveness certainly.

The blend amount of the aminosilane is preferably from 0.5 to 10 parts by weight, more preferably from 1 to 3 parts by weight with respect to of the reactive-silicon-group-having organic polymer (A). If the blend amount of the aminosilane is less than 0.5 part by weight, a sufficient adhesiveness may not be obtained. On the other hand, if the blend amount of the aminosilane is more than 10 parts by weight, the transparency of the cured article may be impaired, time may be required for curing the curable composition or the cured article may become brittle. Aminosilane may not be added in accordance with an article where the composition is used.

Specific examples of the epoxysilane include epoxy-group-containing silanes such as γ-glycycloxypropyltrimethoxysilane, γ-glycycloxypropyltriethoxysilane, γ-glycycloxypropylmethyldimethoxysilane, β-(3,4-epoxycyclohexyl)ethyltrimethoxysilane, and β-(3,4-epoxycyclohexyl)ethyltriethoxysilane. Out of these, preferred are γ-glycycloxypropyltrimethoxysilane, γ-glycycloxypropyltriethoxysilane, and γ-glycycloxypropylmethyldimethoxysilane in order to keep a good adhesiveness certainly.

The blend amount of the epoxysilane is preferably from 0.5 to 20 parts by weight, more preferably from 1 to 10 parts by weight with respect to of the reactive-silicon-group-having organic polymer (A). If the blend amount of the epoxysilane is less than 0.5 part by weight, a sufficient adhesiveness may not be obtained. On the other hand, if the blend amount of the epoxysilane is more than 20 parts by weight, time may be required for the curing the curable composition. Epoxysilane may be added in accordance with an article where the composition is used.

In the case that the present curable composition is a one-component curable composition, it is necessary to decide the blend amount of the epoxysilane together with the amount of the aminosilane. The mole number of all amino groups of the aminosilane contained in the composition is preferably larger than the mole number of all epoxy groups of the epoxysilane contained in the composition. If the mole number of all the amino groups of the aminosilane is smaller than that of all the epoxy groups of the epoxysilane, the composition exhibits a remarkably lowered curability after stored. The reason for this will be described hereinafter. When the bivalent tin carboxylate of the component (B) acts as a silanol condensing catalyst, the amine compound of the component (C) in the invention produces an effect of raising the catalytic activity. If the mole number of all the epoxy groups of the epoxysilane contained in the composition is larger than that of all the amine groups of the aminosilane, an excessive amount of the epoxy groups reacts with the amino groups of the component (C) when the one-component curable composition is stored. Consequently, the component (C) effective for raising the activity of the component (B) is unfavorably decreased. Therefore, at the time of using the curable composition, the catalytic activity of the component (B) cannot be sufficiently raised so that the curing speed becomes slow.

When the composition is used in a two-component form, the above-mentioned problem is not caused. Thus, the blend amounts of the aminosilane and the epoxysilane can be set at will.

A silane coupling agent other than aminosilanes and epoxy silanes, or a reactant of a silane coupling agent can be added, as an adhesion-imparting agent, to the composition of the invention. Specific examples of the silane coupling agent include isocyanate-group-containing silanes such as γ-isocyanatepropyltrimethoxysilane, γ-isocyanatepropyltriethoxysilane, γ-isocyanatepropylmethyldiethoxysilane, γ-isocyanatepropylmethyldimethoxysilane, (isocyanatemethyl)trimethoxysilane, and (isocyanatemethyl)dimethoxymethylsilane; mercapto-group-containing silanes such as γ-mercaptopropyltrimethoxysilane, γ-mercaptopropyltriethoxysilane, γ-mercaptopropylmethyldimethoxysilane, γ-mercaptopropylmethyldiethoxysilane, and mercaptomethyltriethoxysilane; carboxysilanes such as β-carboxyethyltriethoxysilane, β-carboxyethylphenylbis(2-methoxyethoxy)silane, and N-β-(carboxymethyl)aminoethyl-γ-aminopropyltrimethoxysilane; vinyl-unsaturated-group-containing silanes such as vinyltrimethoxysilane, vinyltriethoxysilane, γ-methacryloyloxypropylmethyldimethoxysilane, and γ-acryloyloxypropylmethyltriethoxysilane; halogen-containing silanes such as γ-chloropropyltrimethoxysilane; and isocyanurate silanes such as tris(trimethoxysilyl) isocyanurate. Condensation products wherein the above-mentioned silanes are partially condensed can also be used. Furthermore, it is allowable to use, as the silane coupling agent, an amino-modified silyl polymer, a silylated aminopolymer, an unsaturated aminosilane complex, a phenylamino long-chain alkyl silane, aminosilylated silicone, a silylated polyester or the like, which is a derivative obtained by modifying one out of the above-mentioned compounds. The silane coupling agent used in the invention is used usually in an amount ranging from 0.1 to 20 parts by weight with respect to of the reactive-silicon-group-having organic polymer (A). It is particularly preferred to use it in an amount ranging from 0.5 to 10 parts by weight.

In the case of using the silane coupling agent added to the curable composition of the invention for various substrates, that is, inorganic substrates each made of glass, aluminum, stainless steel, zinc, copper, mortar or the like, and organic substrates each made of vinyl chloride, an acrylic compound, polyester, polyethylene, polypropylene, polycarbonate or the like, the agent produces a remarkable adhesiveness-improving effect under a non-primer condition or a primer treated condition. In the case of using it under a non-primer condition, the effect of improving the adhesiveness onto various substrates is particularly remarkable.

A compound other than any silane coupling agent can be added, as an adhesion-imparting agent, to the composition of the invention. Specific examples of the agent other than any silane coupling agent are epoxy resin, phenol resin, sulfur, alkyltitanates, and aromatic polyisocyanates, but the agent is not particularly limited thereto. The above-mentioned adhesion-imparting agents may be used alone or in the form of a mixture of two or more thereof. The addition of these adhesion-imparting agents makes it possible to improve the adhesiveness onto substrates.

Moreover, a silicate can be used in the composition of the invention. This silicate acts as a crosslinking agent, and has a function of improving the restorability, the durability and creep resistance of the component (A) in the invention. Furthermore, the silicate also has an effect of improving the adhesiveness, the water-resistant adhesiveness, and the adhesiveness durability at high temperature and high humidity. As the silicate, tetraalkoxysilane or a partially-hydrolyzed condensation product thereof can be used. In the case of using the silicate, the use amount thereof is preferably from 0.1 to 20 parts by weight, more preferably from 0.5 to 10 parts by weight with respect to of the organic polymer of the component (A).

Specific examples of the silicate include tetraalkoxysilanes (tetraalkylsilicates) such as tetramethoxysilane, tetraethoxysilane, ethoxytrimethoxysilane, dimethoxydiethoxysilane, methoxytriethoxysilane, tetra-n-propoxysilane, tetra-i-propoxysilane, tetra-n-butoxysilane, tetra-i-butoxysilane, and tetra-t-butoxysilane; and partially-hydrolyzed condensation products thereof.

Examples of the partially-hydrolyzed condensation products of tetraalkoxysilanes include products each obtained by adding water to a tetraalkoxysilane in a usual way, and then hydrolyzing the resultant partially so as to be condensed. As partially-hydrolyzed condensation products of organosilicate compounds, commercially available products can be used. Examples of the condensation products include Methyl Silicate 51, and Ethyl Silicate 40 (each manufactured by Colcoat Co., Ltd.).

A plasticizer can be added to the composition of the invention. The addition of the plasticizer makes it possible to adjust the viscosity and the slump property of the curable composition, and the tensile strength, the elongation characteristic and other mechanical properties of the cured article obtained by curing the composition. Examples of the plasticizer include phthalic acid esters such as dibutyl phthalate, diheptyl phthalate, bis(2-ethylhexyl) phthalate, and butylbenzyl phthalate; non-aromatic bibasic acid esters such as dioctyl adipate, dioctyl sebacate, dibutyl sebacate, and isodecyl succinate; aliphatic esters such as butyl oleate, and methyl acetylricinolate; phosphates such as tricresyl phosphate, and tributyl phosphate; trimellitic acid esters; chlorinated paraffins; hydrocarbon oils such as alkyldiphenyl, and partially-hydrogenated terphenyl; process oils; epoxy plasticizers such as epoxidized soybean oil, benzyl epoxystearate, and bis(2-ethylhexyl)-4, 5-epoxycyclohexane-1,2-dicarboxylate (E-PS).

A polymeric plasticizer can also be used. In the case of using the polymeric plasticizer, the initial physical properties are maintained over a longer term than in the case of using a low molecular weight plasticizer, which does not contain in the molecule thereof any polymeric component. Furthermore, when an alkyd paint is painted onto the cured article, the dryability, which may be called paintability, can be improved. Specific examples of the polymeric plasticizer include vinyl polymers, which are each obtained by polymerizing a vinyl monomer by a variety of methods; polyalkylene glycol esters such as diethylene glycol dibenzoate, triethylene glycol dibenzoate, and pentaerythritol esters; polyester plasticizers each made from a dibasic acid such as sebacic acid, adipic acid, azelaic acid or phthalic acid, and a dihydric alcohol such as ethylene glycol, diethylene glycol, triethylene glycol, propylene glycol or dipropylene glycol; polyethers, for example, polyetherpolyols such as polyethylene glycol, polypropylene glycol or polytetramethylene glycol having a molecular weight of 500 or more, preferably 1000 or more, or derivatives obtained by changing hydroxyl groups of these polyetherpolyols to ester groups, ether groups, or the like; polystyrenes such as polystyrene, and poly-α-methylstyrene; and polybutadiene, polybutene, polyisobutylene, butadiene-acrylonitrile, and polychloroprene. However, the polymeric plasticizer is not limited thereto.

Out of these polymeric plasticizers, ones compatible with the polymer of the component (A) are preferred. From this viewpoint, polyethers and vinyl polymers are preferred. When a polyether is used as the plasticizer, the depth curability is improved. Moreover, after the composition is stored, the composition does not undergo curing delay. Thus, the use is preferred. Out of the plasticizers, polypropylene glycol is more preferred. From the viewpoint of compatibility, weather resistance and heat resistance, vinyl polymers are preferred. Out of the vinyl polymers, acrylic polymers and/or methacrylic polymers are preferred, and acrylic polymers such as poly(alkyl acrylate) are more preferred. The method for synthesizing the polymers is preferably a living radical polymerization method since the molecular weight distribution is narrow and a low viscosity can be obtained. An atom transfer radical polymerization method is more preferred. It is also preferred to use a polymer based on the so-called SGO process, which is obtained by subjecting an alkyl acrylate monomer described in JP-A-2001-207157 to continuous bulk polymerization at high temperature and high pressure.

The number-average molecular weight of the polymeric plasticizer is preferably from 500 to 15000, more preferably from 800 to 10000, even more preferably from 1000 to 8000, in particular preferably from 1000 to 5000. The molecular weight is most preferably from 1000 to 3000. If the molecular weight is too low, the plasticizer flows out with time by heat or rainfall so that the initial physical properties cannot be maintained over a long term, and the alkyd paintability cannot be improved. If the molecular weight is too high, the viscosity becomes high so that the workability deteriorates. The molecular weight distribution of the polymeric plasticizer is not particularly limited, and a narrow distribution is preferred. The distribution is preferably less than 1.80, more preferably 1.70 or less, even more preferably 1.60 or less, even more preferably 1.50 or less, in particular preferably 1.40 or less, most preferably 1.30 or less.

In the case that the plasticizer is a vinyl polymer, the number-average molecular weight is measured by a GPC method. In the case that the plasticizer is a polyether polymer, the number-average molecular weight is measured by terminal group analysis. The molecular weight distribution (Mw/Mn) is measured by a GPC method (in terms of polystyrene).

The polymeric plasticizer may have no reactive silicon group, or may have a reactive silicon group. When the plasticizer has a reactive silicon group, the plasticizer acts as a reactive plasticizer. Thus, the plasticizer can be prevented from being shifted from the cured article. When the plasticizer has one or more reactive silicon groups, the number of the reactive silicon groups is preferably 1 or less, more preferably 0.8 or less per molecule on average. In the case of using a plasticizer having a reactive silicon group, in particular, an oxyalkylene polymer having a reactive silicon group, the number-average molecular weight thereof is preferably lower than that of the polymer of the component (A).

About the plasticizer, one species thereof may be used alone, or two or more species thereof may be used together. A low molecular weight plasticizer and a polymeric plasticizer may be used together. These plasticizers may be blended when the polymer is produced.

The use amount of the plasticizer is from 0.1 to 150 parts by weight, preferably from 0.5 to 120 parts by weight, even more preferably from 1 to 100 parts by weight with respect to of the polymer of the component (A). If the amount is less than 0.1 part by weight, effects as a plasticizer are not expressed. If the amount is more than 150 parts by weight, the mechanical strength of the cured article is insufficient.

If necessary, a physical property adjustor for adjusting tensile characteristics of the cured article to be produced may be added to the curable composition of the invention. The physical property adjustor is not particularly limited, and examples thereof include alkylalkoxysilanes such as methyltrimethoxysilane, dimethyldimethoxysilane, trimethylmethoxysilane, and n-propyltrimethoxysilane; alkoxysilanes having an unsaturated group, such as dimethyldiisopropenoxysilane, methyltriisopropenoxysilane, other alkylisopropenoxysilanes, vinyltrimethoxysilane, and vinyldimethylmethoxysilane; silicone vanish; and polysiloxanes. The use of the physical property adjustor makes it possible that when the composition of the invention is cured, the hardness is raised or the hardness is conversely lowered so as to cause rupture elongation. The above-mentioned physical property adjustors may be used alone or in combination of two or more thereof.

In particular, a compound which can be hydrolyzed to generate a compound having in the molecule thereof a monovalent silanol group has an effect of lowering the modulus of the cured article without deteriorating the stickiness of the surface of the cured article. A compound which can generate trimethylsilanol is particularly preferred. Examples of the compound which can be hydrolyzed to generate a compound having in the molecule thereof a monovalent silanol group include compounds described in JP-A-5-117521. Other examples thereof include compounds which are each a derivative of an alkylalcohol such as hexanol, octanol or decanol, and can each generate a silicon compound which can be hydrolyzed to generate $R_3SiOH$ such as trimethylsilanol; and compounds, described in JP-A-11-241029, which are each a derivative of a polyhydric alcohol having 3 or more hydroxyl groups, such as trimethylolpropane, glycerin, pentaerythritol or sorbitol, and which can each generate a silicon compound that can be hydrolyzed to generate $R_3SiOH$ such as trimethylsilanol.

Different examples thereof include compounds which are each a derivative of an oxypropylene polymer, and which can each generate a silicon compound that can be hydrolyzed to generate $R^3SiOH$ such as trimethylsilanol, as described in JP-A-7-258534. Furthermore, there can be used a polymer having a crosslinkable, hydrolyzable silicon-containing group and a silicon-containing group which can be hydrolyzed so as to be converted to a monosilanol-containing compound, as described in JP-A-6-279693.

The physical property adjustor is used in an amount of 0.1 to 20 parts by weight, preferably 0.5 to 10 parts by weight with respect to of the reactive-silicon-group-having organic polymer (A).

In the composition of the invention, a photo-curable material can be used as long as the transparency is not impaired. When the photo-curable material is used, a coating of the photo-curable material is formed on the surface of the cured article. Thus, the stickiness or the weather resistance of the cured article can be improved. The photo-curable material is a material which undergoes a chemical change in the molecular structure by action of light so as to cause a physical change such as curing. As a compound of this type, many materials are known, examples of which include organic monomers, oligomers, resins, and compositions containing these materials. Any commercially available product can be used. Typically, an unsaturated acrylic compound, a polyvinyl cinnamate, an azide resin or the like can be used. The unsaturated acrylic compound is a monomer or oligomer having one or more acrylic or methacrylic unsaturated groups, or a mixture thereof. Examples thereof include monomers such as propylene (or butylene or ethylene) glycol di(meth)acrylate, neopentyl glycol di(meth)acrylate, or oligoesters made from such a monomer and having a molecular weight of 10000 or less. Specific examples thereof include ARONIX M-210, ARONIX M-215, ARONIX M-220, ARONIX M-233, ARONIX M-240, and ARONIX M-245, which are each an especial (bifunctional) acrylate; (trifunctional) ARONIX M-305, ARONIX M-309, ARONIX M-310, ARONIX M-315, ARONIX M-320, and ARONIX M-325; and (polyfunctional) ARONIX M-400. (The above-mentioned ARONIX'es are products manufactured by Toagosei Co., Ltd.) Out of these, compounds having an acrylic functional group are preferred, and compounds each containing in a single molecule thereof 3 or more acrylic functional groups on average are preferred.

Polyvinyl cinnamate is a photosensitive resin having a cinnamoyl group as a photosensitive group, and examples thereof include a product obtained by esterifying polyvinyl alcohol with cinnamic acid, and many polyvinyl cinnamate derivatives. The azide resin is known as a photosensitive resin having an azide group as a photosensitive group. An example thereof is a rubber photosensitive liquid wherein a diazide compound is usually added as a photosensitive agent. Besides, detailed examples thereof are described in "Photosensitive Resin" (published on Mar. 17, 1972 by Insatsu Gakkai Shuppanbu Ltd., on and after p. 93, on and after p. 106, and on and after p. 117). These may be used alone or in a mixture form in a state that a sensitizer is added thereto if necessary. When a sensitizer such as a ketone or a nitro compound, or an accelerator such as an amine is added thereto, advantageous effects may be enhanced. It is advisable to use the photo-curable material in an amount of 0.1 to 20 parts by weight, preferably 0.5 to 10 parts by weight with respect to of the reactive-silicon-group-having organic polymer (A). If the amount is less than 0.1 part by weight, no effect of improving the weather resistance is produced. If the amount is 20 parts or more by weight, the cured article becomes too hard so that the product tends to be cracked.

An oxygen curable material can be used in the composition of the invention. Examples of the oxygen curable material include unsaturated compounds reactive with oxygen in air. The material reacts with oxygen in air to form a cured coating in the vicinity of the surface of the cured article, thereby fulfilling an act of preventing the stickiness of the surface or adhesion of wastes or dust onto the cured article surface. Specific examples of the oxygen curable material include drying oils, typical examples of which are tung oil and linseed oil; various alkyd resins obtained by modifying the compounds; acrylic polymer, epoxy resin, and silicone resin which are each modified with a drying oil; liquid polymers such as 1,2-polybutadiene, 1,4-polybutadiene, and C5 to C8 diene polymer, which are each obtained by polymerizing or copolymerizing one or more diene compounds such as butadiene, chloroprene, isorepene, and 1,3-pentadiene; liquid copolymers such as NBR and SBR, which are each obtained by copolymerizing a monomer copolymerizable with the diene compounds, such as acrylonitrile or styrene, with one or more of the diene compounds so as to make the diene compound(s) into one or more main components; and various modified products thereof (such as maleic acid modified products and boiled oil modified products). These may be used or in combination of two or more thereof. Out of these, tung oil and liquid diene polymers are particularly preferred. When a catalyst for promoting the oxidization curing reaction or a metal drier is used together, the advantageous effects may be enhanced. Examples of the catalyst or metal drier include metal salts such as cobalt naphthenate, lead naphthenate, zirconium naphthenate, cobalt octylate and zirconium octylate; and amine compounds. The use amount of the oxygen curable material is preferably from 0.1 to 20 parts by weight, more preferably 0.5 to 10 parts by weight with respect to of the reactive-silicon-group-having organic polymer (A). If the use amount is less than 0.1 part by weight, an improvement in pollution resistance is insufficient. If the amount is more than 20 parts by weight, the tensile characteristic or the like of the cured article tends to be impaired. As described in JP-A-3-160053, it is desired to use the oxygen curable material together with the photo-curable material.

An antioxidant (age resistor) can be used in the composition of the invention. When the antioxidant is used, the heat resistance of the cured article can be enhanced. Examples of the antioxidant include hindered phenols, monophenols, bisphenols, and polyphenols. Particularly preferred are hindered phenols. Similarly, the following can also be used: a hindered amine photostabilizer named TINUVIN 622LD, TINUVIN 144, CHIMASSORB 944LD, or CHIMASSORB 119FL (each manufactured by Ciba Specialty Chemicals Inc.); MARK LA-57, MARK LA-62, MARK LA-67, MARK LA-63, or MARK LA-68 (each manufactured by ADEKA CORPORATION.); or SANOL LS-770, SANOL LS-765, SANOL LS-292, SANOL LS-2626, SANOL LS-1114, or SANOL LS-744 (each manufactured by Sankyo Co., Ltd.). Specific examples of the antioxidant are described in JP-A-4-283259 and 9-194731 also. The use amount of the antioxidant is preferably from 0.1 to 10 parts by weight, more preferably from 0.2 to 5 parts by weight with respect to of the reactive-silicon-group-having organic polymer (A).

A photostabilizer can be used in the composition of the invention. The use of the photostabilizer makes it possible to prevent the cured article form being deteriorated by photooxidation. Examples of the photostabilizer include benztriazole compounds, hindered amine compounds, and benzoate compounds. Particularly preferred are hindered amine compounds. The use amount of the photostabilizer is preferably from 0.1 to 10 parts by weight, more preferably from 0.2 to 5 parts by weight with respect to of the reactive-silicon-group-having organic polymer (A). Specific examples of the photostabilizer are described in JP-A-9-194731 also.

In the case of using a photocurable material, in particular, an unsaturated acrylic compound together in the composition of the invention, it is preferred to use a tertiary-amine-containing hindered amine photostabilizer as a hindered amine photostabilizer, as described in JP-A-5-70531, in order to improve the storage stability of the composition. Examples of the tertiary-amine-containing hindered amine photostabilizer include photostabilizers named TINUVIN 622LD, TINUVIN 144, and CHIMASSORB 119FL (each manufactured by Ciba Specialty Chemicals Inc.); MARK LA-57, MARK LA-62, MARK LA-67, and MARK LA-63 (each manufactured by ADEKA CORPORATION.); and SANOL LS-765, SANOL LS-292, SANOL LS-2626, SANOL LS-1114, and SANOL LS-744 (each manufactured by Sankyo Co., Ltd.).

An ultraviolet absorber can be used in the composition of the invention. The use of the ultraviolet absorber makes it possible to enhance the surface weather resistance of the cured article. Examples of the ultraviolet absorber include benzophenone compounds, benzotriazole compounds, salicylate compounds, substituted tolyl compounds, and metal chelate compounds. Particularly preferred are benzotriazole compounds. The use amount of the ultraviolet absorber is preferably from 0.1 to 10 parts by weight, more preferably from 0.2 to 5 parts by weight with respect to of the reactive-silicon-group-having organic polymer (A). It is preferred to use a phenolic or hindered phenolic antioxidant, a hindered amine photostabilizer, and a benzotriazole ultraviolet absorber together.

A solvent can be used in the composition of the invention to decrease the viscosity of the composition, make the thixotropy high, and improve the workability. The solvent is not particularly limited, and various compounds can be used. Specific examples thereof include hydrocarbon solvents such as toluene, xylene, heptane, hexane, and petroleum-based solvents, halogen-containing solvents such as trichloroethylene, ester solvents such as ethyl acetate and butyl acetate, ketone solvents such as acetone, methyl ethyl ketone, and methyl isobutyl ketone, alcohol solvents such as methanol, ethanol, and isopropanol, and silicone solvents such as hexamethylcyclotrisiloxane, octamethylcyclotetrasiloxane, and decamethylcyclopentasiloxane. These solvents may be used alone or in combination of two or more thereof.

However, in the case that the blend amount of the solvent is large, toxicity to the human body may become high and further a shrinkage in the volume of the cured article or the like may be observed. Accordingly, the blend amount of the solvent is preferably 3 parts or less by weight, more preferably 1 part or less by weight with respect to of the organic polymer of the component (A). Most preferably, the composition does not substantially contain any solvent.

If necessary, various additives may be added to the curable composition of the invention in order to adjust various physical properties of the curable composition or the cured article. Examples of such additives include a flame retardant, a curability adjustor, a radical inhibitor, a metal inactivating agent, an ozone deterioration preventive, a phosphorus-containing peroxide decomposer, a lubricant, a pigment, a foaming agent, and an antifungal agent. These additives may be used alone or in combination of two or more thereof. Specific examples other than the specific examples of the additives described in the specification are described in JP-B-4-69659 and 7-108928, and JP-A-63-254149, 64-22904 and 2001-72854, and others.

The curable composition of the invention can be prepared into a one-component form, wherein all blend components are beforehand blended, air-tightly sealed up and stored, and after the resultant blend is actually used, the blend is cured with moisture in the air. Alternatively, the composition can be prepared into a two-component form, wherein a curing catalyst, a filler, a plasticizer, water and other components are separately blended with each other as a curing agent, and this blend and a polymer composition are mixed before used.

In the case that the curable composition is in a one-component form, all of the blend components are beforehand blended with each other; therefore, it is preferred to use the blend components which contain water after the components are dehydrated and dried in advance, or dehydrate the composition by pressure-reduction or the like when the components are blended and kneaded. In the case that the curable composition is in a two-component form, it is unnecessary to blend a curing catalyst with the main agent containing the reactive-silicon-group-having polymer; therefore, it is hardly feared that the blend components are gelatinized even if the components contain a certain amount of water. However, in the case that the composition is required to have storage stability for a long term, the composition is preferably dehydrated and dried. Preferred examples of the method for the dehydration and drying include a heating drying method when the composition is in the form of a solid such as powder; and a pressure-reducing dehydrating method or a dehydrating method using synthetic zeolite, activated alumina, silica gel or the like when the composition is in a liquid form. It is allowable to incorporate a small amount of an isocyanate compound into the composition to cause the isocyanate group to react with water, thereby attaining dehydration. By the addition of the following compound besides this dehydration drying method, the storage stability is made better: a lower alcohol such as methanol or ethanol; or an alkoxysilane compound such as n-propyltrimethoxysilane, vinyltrimethoxysilane, vinylmethyldimethoxysilane, γ-mercaptopropylmethyldimethoxysilane, γ-mercaptopropylmethyldiethoxysilane, or γ-glycycloxypropyltrimethoxysilane.

The use amount of the dehydrating agent, in particular, a silicon compound reactive with water, such as vinyltrimethoxysilane, is preferably from 0.1 to 20 parts by weight, more preferably from 0.5 to 10 parts by weight with respect to of the reactive-silicon-group-having polymer (A).

The method for preparing the curable composition of the invention is not particularly limited, and a usual method is adopted, an example of the method being a method of blending the above-mentioned components with each other, and then using a mixer, a roll, a kneader or the like to knead the blend at normal temperature or while the blend is heated, or a method of using a small amount of an appropriate solvent to dissolve the above-mentioned components therein, and then mixing the components.

When the curable composition of the invention is exposed to the atmosphere, the composition forms a three-dimensional network structure by action of water, so as to be cured into a solid having rubbery elasticity.

The curable composition of the invention can be used for a binder, a sealing agent for a building, ship, car or road, an adhesive, a mold or pattern-forming material, a vibration isolating material, a vibration reducing material, a soundproof material, a foaming material, a paint, a spraying material, and so on. The composition is more preferably used as a sealant or an adhesive, out of the above-mentioned materials, since the cured article obtained by curing the curable composition of the invention is excellent in flexibility and adhesiveness.

The curable composition can be used for various articles, such as electrical/electronic part materials such as a solar cell sealant, electrically insulating materials such as an insulating coating material for electric wires/cables, elastic adhesives, powdery paints, casting materials, rubber materials for medical treatment, adhesives for medical treatment, medical instrument sealants, food wrapping materials, joint sealants for outer packaging materials such as a siding board, coating materials, primers, electromagnetic-wave-shielding electro-conductive materials, thermally conductive materials, hot melt materials, electrical and electronic potting agents, films, gaskets, various molding materials, rust resisting/waterproof sealants for an end face (cut portion) of net-incorporated glass or laminated glass, and liquid sealants used in automobile parts, electrical parts, or various mechanical parts. Furthermore, the curable composition can adhere closely to various substrates such as glass, ceramic, wood, metal, and resin molded product substrates by itself or by aid of a primer; therefore, the curable composition can also be used as various types of sealing compositions or adhesive compositions. Moreover, the curable composition of the invention can be used as an adhesive for interior panels, an adhesive for exterior panels, a tile-laying adhesive, a stone-material-laying adhesive, a ceiling finishing adhesive, a floor finishing adhesive, a wall finishing adhesive, an adhesive for automobile panels, an electrical/electronic/precision instrument fabricating adhesive, a direct grading sealant, a sealant for double glazing, a sealant for the SSG method, or a sealant for working joints of a building.

The curable composition of the invention can give a highly transparent cured article wherein the amount of bubbles is small. Thus, the composition is particularly suitable as a raw material for molding a transparent cured article. When the curable composition of the invention is cured, it is possible to yield a cured article excellent in transparency, for example, a transparent cured article wherein the transmittance of all light rays is 70% or more when the article is a sample having a thickness of 5 mm. Since the curable composition of the invention is good in curability, such a transparent cured article can be yielded in or before 7 days from the curing.

It is sufficient that curing conditions for forming a transparent cured article of the invention are ordinary conditions under which sealants or adhesives are used. Specifically, it is advisable that the temperature ranges from 0 to 90° C. Preferably, the temperature is substantially from 5 to 50° C., preferably from 10 to 40° C., more preferably from 15 to 35° C. If the temperature is 0° C. or lower, a long time is required for curing the composition. If the temperature is 90° C. or more, the composition is too rapidly cured so that the transparency tends to be lowered. If the composition is slowly cured under the above-mentioned conditions, it is allowable to heat the composition in the range of 30 to 90° C. to promote the curing thereof.

It is advisable to set the humidity into the range of 5 to 95% R.H. The humidity preferably ranges substantially from 20 to 80% R.H. The curable composition of the invention reacts with moisture in the air so that the curing thereof proceeds; thus, if the humidity is 5% R.H. or less, a long time is required for the curing.

The time until the composition is cured, which depends on the usage thereof, is desirably 7 days or less. The curable composition of the invention is good in curability; therefore, the curing thereof proceeds in 7 days or less under the above-mentioned temperature and humidity conditions. However, if 7 days or more are required, the problem can be solved by increasing the amounts of the component (B) and the component (C). The curing speed can also be improved by a method of decreasing the dehydrating agent into an appropriate amount.

EXAMPLES

The present invention will be specifically described by the following working examples and comparative examples; however, the invention is not limited to these examples.

Synthesis Example 1

Polyoxypropylene diol having a molecular weight of about 2,000 was used as an initiator to polymerize propylene oxide in the presence of a zinc hexacyanocobalate glyme complex catalyst to yield a polypropylene oxide (P-0) having at its terminals hydroxyl groups and having a number-average molecular weight of about 25,500, which was a molecular weight in terms of polystyrene measured by use of an HLC-8120 GPC manufactured by Tosoh Corp. as a liquid-feeding system, a TSK-GEL H type column manufactured by Tosoh Corp., and THF as a solvent. Subsequently, a solution of NaOMe in methanol was added thereto at an equivalent 1.2 times the amount of the hydroxyl groups of this hydroxyl-group-terminated polyoxypropylene polymer (P-0), and methanol was distilled off. Furthermore, allyl chloride was added thereto so as to convert the hydroxyl groups at the terminals to allyl groups. Unreacted allyl chloride was volatilized and removed in the form of a gas under reduced pressure. Into 100 parts by weight of the resultant crude allyl-group-terminated polyoxypropylene polymer were incorporated 300 parts by weight of n-hexane and 300 parts by weight of water, and then the mixture was stirred. Water was then removed therefrom by centrifugal separation. Furthermore, 300 parts by weight of water were incorporated into the resultant solution in hexane, and then the mixture was stirred. Water was again removed therefrom by centrifugal separation, and then hexane was volatilized and removed in the form of a gas under reduced pressure. This way gave an allyl-group-terminated bifunctional polyoxypropylene having a number-average molecular weight of about 25,500. At 90° C., 150 ppm of a solution of a platinum vinylsiloxane complex in isopropanol, the platinum content by percentage being 3% by weight, was used as a catalyst to cause 0.9 part by weight of methyldimethoxysilane to react with 100 parts by weight of this allyl-group-terminated polyoxypropylene polymer for 5 hours, so as to yield a methyldimethoxysilyl-group-terminated polyoxypropylene polymer (P-1). According to measurement by $^1$H-NMR (measurement in a $CDCl_3$ solvent by use of a JNM-LA400 manufactured by JEOL Ltd.), the number of the methyldimethoxysilyl groups at the terminals was 1.3 per molecule on average.

Synthesis Example 2

To 100 parts by weight of the hydroxyl-group-terminated polyoxypropylene polymer (P-0), which was yielded in Synthesis Example 1, were added 1.8 parts by weight of γ-isocyanatepropyltrimethoxysilane, and the components were caused to react with each other at 90° C. for 5 hours to yield a trimethoxysilyl-group-terminated polyoxypropylene polymer (P-2) having a main chain skeleton having urethane bonds. According to the same $^1$H-NMR measurement as in synthesis Example 1, the number of the trimethoxysilyl groups at the terminals was 1.3 per molecule on average.

Synthesis Example 3

Into a flask were charged 6.0 g of n-butyl acrylate, 66 g of methyl methacrylate, 13 g of stearyl methacrylate, 5.4 g of 3-methacryloxypropylmethyldimethoxysilane, 7.0 g of 3-mercaptopropylmethyldimethoxysilane, and 23 g of isobutanol. Furthermore, thereinto was dissolved 2.6 g of azobisisobutyronitrile as a polymerization initiator to prepare a mixed solution. Into a separable flask equipped with a stirrer, a thermostat and a nitrogen-introducing port was charged 43 g of isobutanol. The resultant was heated to 105° C. and nitrogen was bubbled thereinto, so as to purge the inside of the flask with nitrogen. Thereafter, while the solution was stirred, the above-mentioned monomer mixed solution was dropwise added thereto over 4 hours. Furthermore, the resultant was subjected to post-polymerization for 2 hours. The resultant reactive-silicon-group-containing acrylic polymer (A-1) was a solution in isobutanol having a solid concentration of 60%, and the number-average molecular weight Mn thereof in terms of polystyrene was 1,800 on the basis of the same GPC as in Synthesis Example 1.

Synthesis Example 4

Into 1-L flask were charged 2.84 g of copper (I) bromide and 39 mL of acetonitrile, and the solution was heated and stirred at 70° C. under gas flow of nitrogen for 20 minutes. Thereto were added 5.93 g of diethyl 2,5-dibromoadipate, 254 mL of n-butyl acrylate, 61 mL of ethyl acrylate, and 71 mL of stearyl acrylate, and the resultant was heated and stirred at 80° C. for 20 minutes. Thereto was added 0.41 mL of pentamethyldiethylenetriamine (hereinafter referred to as triamine) to start reaction. Thereto was further added 0.14 mL of triamine. Heating at 80° C. and stirring of the resultant were continued while 0.14 mL of triamine was added thereto. After 180 minutes from the reaction start, the pressure in the reaction vessel was decreased to remove volatile components. After 240 minutes from the reaction start, thereto were added 118 mL of acetonitrile, 49 mL of 1,7-octadiene, and 1.38 mL of triamine, and subsequently heating at 80° C. and stirring of the resultant were continued. After 620 minutes from the reaction start, the heating was stopped. The reaction solution was heated under reduced pressure to remove volatile components. Thereafter, the resultant was diluted with toluene and filtrated. The filtrate was concentrated to yield a polymer. Into 100 parts by weight of xylene were incorporated 100 parts by weight of the resultant polymer, 2 parts by weight of aluminum silicate manufactured by Kyowa Chemical Industry Co., Ltd., KYOWARD 500SH, and 2 parts by weight of aluminum silicate manufactured by Kyowa Chemical Industry Co., Ltd., KYOWARD 700SL, and then the mixture was stirred at 130° C. After 3 hours, the aluminum silicates were filtrated off, and volatile components in the filtrate were distilled off by heating under reduced pressure. The polymer was heated at 180° C. for 12 hours while gas was removed therefrom (the degree of reduced pressure: 10 torr or less). In this way, Br groups were eliminated from the copolymer. Into 100 parts by weight of xylene were incorporated 100 parts by weight of the polymer, 3 parts by weight of the KYOWARD 500SH, and 3 parts by weight of the KYOWARD 700SL, and then the mixture was stirred at 130° C. After 5 hours, the aluminum silicates were filtrated off, and volatile components in the filtrate were distilled off by heating under reduced pressure, so as to yield an alkenyl-terminated polymer. Next, into a 200-mL pressure-resistant glass reaction vessel were charged 23.3 g of the above-mentioned polymer, 2.55 mL of methyldimethoxysilane, 0.38 mL of dimethyl orthoformate, and a platinum catalyst. However, the use amount of the platinum catalyst was set to $2 \times 10^{-4}$ equivalents per mole of the alkenyl groups of the polymer. The reaction mixture was heated at 100° C. for 3 hours. Volatile components in the mixture were distilled off under reduced pressure to yield an acrylic polymer (A-2) having, at its terminals, reactive silicon groups. The number-average molecular weight of the resultant methyldimethoxysilyl-group-terminated acrylic polymer (A-2) was 27,000 (in terms of polystyrene) by GPC measurement, and the molecular weight distribution was 1.3. According to the same $^1$H-NMR measurement as in synthesis Example 1, the number of the methyldimethoxysilyl groups at the terminals was 1.7 per molecule on average.

Example 1

The methyldimethoxysilyl-group-terminated polyoxypropylene polymer (P-1) yielded in synthesis Example 1 and a solution of the reactive-silicon-group-containing acrylic polymer (A-1) yielded in synthesis example 3 in isobutanol were mixed with each other at a solid ratio (ratio by weight) of 60/40, and a rotary evaporator was used to heat the mixture at 110° C. and remove gaseous isobutene therefrom, so as to yield a polymer having a solid concentration of 99% or more. Into 100 parts by weight of this polymer were incorporated the following weighed components: 20 parts by weight of diisodecyl phthalate (trade name: SANSOCIZER DIDP, manufactured by New Japan Chemical Co., Ltd.) as a plasticizer; 10 parts by weight of silica (trade name: AEROSIL RY200, manufactured by Nippon Aerosil Co., Ltd.); 1 part by weight of a hindered phenol antioxidant (trade name: STYRENIZED PHENOL manufactured by Ouchi Shinko Chemical Industry Co., Ltd.); 1 part by weight of a benzotriazole-based ultraviolet absorber (trade name: TINUVIN 213, manufactured by Ciba Specialty Chemicals Ltd.); and 1 part by weight of a hindered amine light stabilizer (trade name: SANOL LS765, manufactured by Sankyo Co., Ltd.). These components were sufficiently kneaded, and then the resultant was passed 5 times through a triaxial paint roll to disperse the solid components. Thereto were added 3 parts by weight of γ-glycidoxypropyltrimethoxysilane (trade name: A-187, manufactured by Dow Corning Toray Silicone Co., Ltd.), 3 parts by weight of a curing catalyst, tin 2-ethylhexanoate (trade name: NEOSTAN U-28, manufactured by Nitto Kasei Co., Ltd.) as a bivalent tin carboxylate, and 0.5 part by weight of N,N-diethyl-1,3-propanediamine (abbreviated to DEAPA and manufactured by Wako Pure Chemical Industries, Ltd.) as an amine. These components were kneaded to yield a curable composition.

Example 2

A curable composition was yielded in the same way as in Example 1 except that the methyldimethoxysilyl-terminated polyoxypropylene polymer (P-1) in Example 1 was changed to 60 parts by weight of the trimethoxysilyl-terminated polyoxypropylene polymer (P-2) yielded in synthesis example 2, and further 1 part by weight of γ-(2-aminoethyl)aminopropyltrimethoxysilane (trade name: A-1120, manufactured by Dow Corning Toray Silicone Co., Ltd.) was added.

Example 3

A curable composition was yielded in the same way as in Example 1 except that 3.4 parts by weight of tin versatate (trade name: NEOSTAN U-50, manufactured by Nitto Kasei Co., Ltd.) were used instead of tin 2-ethylhexanoate in example 2 and γ-(2-aminoethyl)aminopropyltrimethoxysilane was not added.

Example 4

A curable composition was yielded in the same way as in Example 1 except that the polymer (P-1) and the polymer (A-1) in Example 1 were not used but instead thereof 100 part by weight of the trimethoxysilyl-terminated polyoxypropylene polymer (P-2) yielded in synthesis example 2 were used.

Example 5

A curable composition was yielded in the same way as in Example 1 except that the amount of the polymer (P-1) in Example 1 was changed to 30 parts by weight, 70 parts by weight of the methyldimethoxysilyl-group-terminated acrylic polymer (A-2) yielded in synthesis example 4 were used instead of the polymer (A-1), and further tin 2-ethylhexanoate was changed to 3.4 parts by weight of tin versatate.

Example 6

A curable composition was yielded in the same way as in Example 1 except that the polymer (P-1) in example 5 was not used, the use amount of the polymer (A-2) was changed to 100 parts by weight, and further 1 part by weight of γ-(2-aminoethyl)aminopropyltrimethoxysilane was added.

Comparative Example 1

A curable composition was yielded in the same way as in Example 1 except that 1.85 parts by weight of potassium 2-ethylhexanoate (trade name: PUCAT 15G, manufactured by Nihon Kagaku Sangyo Co., Ltd.) were used instead of tin 2-ethylhexanoate in Example 1.

Comparative Example 2

A curable composition was yielded in the same way as in Example 1 except that 5.68 parts by weight of calcium 2-ethylhexanoate (trade name: NIKKA OCTHIX Ca 5% (T), manufactured by Nihon Kagaku Sangyo Co., Ltd.) were used instead of tin 2-ethylhexanoate in Example 2.

Comparative Example 3

A curable composition was yielded in the same way as in Example 1 except that 4.41 parts by weight of titanium 2-ethylhexanoate (trade name: TITANIUM TETRA(2-ETHYLHEXANOATE), manufactured by Nitto Kasei Co., Ltd.) were used instead of tin 2-ethylhexanoate in Example 4.

Comparative Example 4

A curable composition was yielded in the same way as in Example 1 except that 5.38 parts by weight of zirconium 2-ethylhexanoate (trade name: NIKKA OCTHIX ZIRCONIUM 12%, manufactured by Nihon Kagaku Sangyo Co., Ltd.) were used instead of tin 2-ethylhexanoate in Example 1.

Comparative Example 5

A curable composition was yielded in the same way as in Example 1 except that 100 parts by weight of the methyldimethoxysilyl-group-terminated acrylic polymer (A-2) yielded in synthesis example 4 were used instead of the polymer (P-1) and the polymer (A-1) in Example 1, and 12.41 parts by weight of cerium 2-ethylhexanoate (trade name: NIKKA OCTHIX CERIUM 8%, manufactured by Nihon Kagaku Sangyo Co., Ltd.) were used instead of tin 2-ethylhexanoate in Example 1.

Comparative Example 6

A curable composition was yielded in the same way as in Example 1 except that 3.86 parts by weight of lead 2-ethylhexanoate (trade name: NIKKA OCTHIX Pb 38%, manufactured by Nihon Kagaku Sangyo Co., Ltd.) were used instead of tin versatate in Example 3.

Comparative Example 7

A curable composition was yielded in the same way as in Example 1 except that 5.92 parts by weight of bismuth 2-ethylhexanoate (trade name: NIKKA OCTHIX Bi 25%, manufactured by Nihon Kagaku Sangyo Co., Ltd.) were used instead of tin 2-ethylhexanoate in Example 1.

Comparative Example 8

A curable composition was yielded in the same way as in example 5 except that 5.12 parts by weight of bismuth neodecanoate (trade name: BISMUTH NEODECANOATE, manufactured by Aldrich Chemical Company Inc.) were used instead of tin versatate in example 5, and further 1 part by weight of γ-(2-aminoethyl)aminopropyltrimethoxysilane was added.

Comparative Example 9

A curable composition was yielded in the same way as in Example 1 except that 2.13 parts by weight of 2-ethylhexanoic acid (trade name: 2-ETHYLHEXANOIC ACID, manufactured by Wako Pure Chemical Industries, Ltd.) were used instead of tin 2-ethylhexanoate in Example 1.

Comparative Example 10

A curable composition was yielded in the same way as in Example 1 except that 2.58 parts by weight of versatic acid (trade name: VERSATIC 10, manufactured by Japan Epoxy Resins Co., Ltd.) were used instead of tin versatate in example 3.

The curable compositions yielded in examples 1 to 6 and comparative examples 1 to 10 described above were used to measure and evaluate individual physical properties thereof in manners described below. The results are shown in Tables 1 and 2.

(Transparency)

At 23° C. and 50% R.H., the curable compositions were each stretched into a flat and smooth form to give a thickness of about 5 mm, and cured for 10 days to produce each cured article. The cured article was put onto a newspaper. A case wherein characters on the newspaper were able to be clearly read through the cured article is represented by ● (excellent), a case where the characters were slightly blurred is represented by Δ (poor), and a case where the characters were not entirely read is represented by X (very poor).

(Coloration of Cured Articles)

The cured articles used in the above-mentioned transparency evaluation were watched, and it was observed whether or not the articles were each colored. A colorless article is preferred in order to use the article as a transparent material.

(Stickiness of Surfaces of Cured Articles)

At 23° C. and 50% R.H., the curable compositions were each stretched into a flat and smooth form to give a thickness of about 5 mm, and cured for 10 days. The resultant cured surface was touched with fingers, and evaluated about the stickiness degree thereof. A state that stickiness was not entirely felt is represented by ● (excellent). In accordance with the order of ●, ○, Δ and x, the stickiness of the sample surfaces becomes larger.

(Dirt Resistance)

At 23° C. and 50% R.H., curable compositions were each stretched into a flat and smooth form to give a thickness of about 5 mm. After one day, Sakurajima volcanic ash was sprinkled thereon. Thereafter, a large amount of water was showered on the surface, and the surface state after the ash was washed off was evaluated. A case wherein the surface was not dirty in the same manner as at the initial stage is represented by ● (excellent), a case wherein the surface was slightly dirty is represented by ○ (good), a case wherein dirt was observed is represented by Δ (poor), and a case wherein the surface was considerably dirty is represented by x (very poor).

(Adhesiveness to Acrylic Plate)

The curable compositions were each put onto an acrylic plate having a surface degreased with ethanol, so as to adhere closely to the plate, and then cured at 23° C. and 50% R.H. for 7 days. Thereafter, a cut was made in the interface between each cured article and the substrate with a razor's edge, and the article and the substrate were pulled away in directions making an angle of 90 degrees. Thereafter, the fracture state of the cured article was observed. A case where the adhesiveness was good and cohesion fracture was observed is represented by CF, and a case wherein the adhesiveness was poor and the article was peeled off in the interface is represented by AF.

TABLE 1

|   |   |   | Examples | | | | | |
|---|---|---|---|---|---|---|---|---|
|   |   |   | 1 | 2 | 3 | 4 | 5 | 6 |
| (A) | Organic polymer | P-1 | 60 | | | | 30 | |
|   |   | P-2 | | 60 | 60 | 100 | | |
|   |   | A-1 | 40 | 40 | 40 | | | |
|   |   | A-2 | | | | | 70 | 100 |
| (B) | Tin 2-ethylhexanoate | NEOSTAN U-28 | 3 | 3 | | 3 | | |
|   | Tin versatate | NEOSTAN U-50 | | | 3.4 | | 3.4 | 3.4 |
| (C) | Amine | N,N-diethyl-1,3-propanediamine | 0.5 | 0.5 | 0.5 | 0.5 | 0.5 | 0.5 |
|   | Epoxysilane | A-187 | 3 | 3 | 3 | 3 | 3 | 3 |
|   | Aminosilane | A-1120 | | 1 | | | | 1 |
|   | Plasticizer | Diisodecyl phthalate | 20 | 20 | 20 | 20 | 20 | 20 |
|   | Silica | Aerosil RY200 | 10 | 10 | 10 | 10 | 10 | 10 |
|   | Antioxidant | STYRENIZED PHENOL | 1 | 1 | 1 | 1 | 1 | 1 |
|   | Ultraviolet absorber | TINUVIN 213 | 1 | 1 | 1 | 1 | 1 | 1 |
|   | Light stabilizer | SANOL LS765 | 1 | 1 | 1 | 1 | 1 | 1 |

TABLE 1-continued

|  | Examples | | | | | |
| --- | --- | --- | --- | --- | --- | --- |
|  | 1 | 2 | 3 | 4 | 5 | 6 |
| Transparency | ⊙ | ○ | ⊙ | ⊙ | ⊙ | ○ |
| Coloration of cured article | Colorless | Colorless | Colorless | Colorless | Colorless | Colorless |
| Stickiness of cured article surface | ⊙ | ⊙ | ⊙ | ⊙ | ⊙ | ⊙ |
| Dirt resistance | ⊙ | ⊙ | ⊙ | ⊙ | ⊙ | ⊙ |
| Adhesiveness to acrylic plate | CF | CF | CF | CF | CF | CF |

TABLE 2

| | | | Comparative Examples | | | | | | | | | |
| --- | --- | --- | --- | --- | --- | --- | --- | --- | --- | --- | --- | --- |
| | | | 1 | 2 | 3 | 4 | 5 | 6 | 7 | 8 | 9 | 10 |
| (A) | Organic polymer | P-1 | 60 | | | 60 | | | 60 | 30 | 60 | |
| | | P-2 | | 60 | 100 | | | 60 | | | | 60 |
| | | A-1 | 40 | 40 | | 40 | | 40 | 40 | | 40 | 40 |
| | | A-2 | | | | | 100 | | | 70 | | |
| (B) | Tin 2-ethylhexanoate | NEOSTAN U-28 | | | | | | | | | | |
| | Tin versatate | NEOSTAN U-50 | | | | | | | | | | |
| | Potassium 2-ethylhexanoate | PUCAT 15G | 1.85 | | | | | | | | | |
| | Calcium 2-ethylhexanoate | NIKKA OCTHIX Ca 5% (T) | | 5.68 | | | | | | | | |
| | Titanium 2-ethylhexanoate | Titanium tetra (2-ethylhexanoate) | | | 4.41 | | | | | | | |
| | Zirconium 2-ethylhexanoate | NIKKA OCTHIX ZIRCONIUM 12% | | | | 5.38 | | | | | | |
| | Cerium 2-ethylhexanoate | NIKKA OCTHIX CERIUM 8% | | | | | 12.41 | | | | | |
| | Lead 2-ethylhexanoate | NIKKA OCTHIX Pb 38% | | | | | | 3.86 | | | | |
| | Bismuth 2-ethylhexanoate | NIKKA OCTHIX Bi 25% | | | | | | | 5.92 | | | |
| | Bismuth neodecanoate | Bismuth neodecanoate | | | | | | | | 5.12 | | |
| | 2-Ethylhexanoic acid | 2-Ethylhexanoic acid | | | | | | | | | 2.13 | |
| | Versatic acid | VERSATIC 10 | | | | | | | | | | 2.58 |
| (C) | Amine | N,N-diethyl-1,3-propanediamine | 0.5 | 0.5 | 0.5 | 0.5 | 0.5 | 0.5 | 0.5 | 0.5 | 0.5 | 0.5 |
| | Epoxysilane | A-187 | 3 | 3 | 3 | 3 | 3 | 3 | 3 | 3 | 3 | 3 |
| | Aminosilane | A-1120 | | 1 | | | | | | 1 | | |
| | Plasticizer | Diisodecyl phthalate | 20 | 20 | 20 | 20 | 20 | 20 | 20 | 20 | 20 | 20 |
| | Silica | Aerosil RY200 | 10 | 10 | 10 | 10 | 10 | 10 | 10 | 10 | 10 | 10 |
| | Antioxidant | STYRENIZED PHENOL | 1 | 1 | 1 | 1 | 1 | 1 | 1 | 1 | 1 | 1 |
| | Ultraviolet absorber | TINUVIN 213 | 1 | 1 | 1 | 1 | 1 | 1 | 1 | 1 | 1 | 1 |
| | Light stabilizer | SANOL LS765 | 1 | 1 | 1 | 1 | 1 | 1 | 1 | 1 | 1 | 1 |
| Transparency | | | X | X | X | X | X | X | X | X | Δ | Δ |
| Coloration of cured article | | | Colorless | Light pink | Yellow | Colorless | Light yellow | Colorless | Light pink | Light yellow | Colorless | Colorless |
| Stickiness of cured article surface | | | ○ | Δ | Δ | Δ | Δ | Δ | Δ | Δ | Δ | Δ |
| Dirt resistance | | | Δ | X | X | X | X | Δ | X | X | X | X |
| Adhesiveness to acrylic plate | | | CF | CF | CF | CF | CF | CF | CF | CF | AF | AF |

As shown in examples 1 to 6, cured articles using a reactive-silicon-group-having organic polymer, a bivalent tin carboxylate and an amine were colorless and high in transparency, gave a small surface stickiness, were not easily dirty, and were good in adhesion to the transparent acrylic plate. On the other hand, in comparative examples 1 to 8, wherein a metal carboxylate other than tin was used, all cured articles were cloudy and poor in transparency, and were colored in accordance with the metal species. Furthermore, their surfaces were very sticky, and dirt adhered to the cured article surfaces. In comparative examples 9 and 10, wherein a carboxylic acid was used, cured articles were not cloudy, but contained small bubbles therein indefinitely, so as to exhibit poor transparency. Moreover, the cured article surfaces were very sticky, and dirt adhered to the cured article surfaces. Furthermore, the adhesiveness to the acrylic plate was poor.

In order to represent transparency numerically, the following examples are given.

Example 7

A curable composition was yielded in the same way as in Example 1 except that 3.4 parts by weight of tin versatate were used instead of tin 2-ethylhexanoate in Example 1, 0.34 part by weight of N-methyl-1,3-propanediamine was used instead of N,N-diethyl-1,3-propanediamine, and the use amount of γ-glycidoxypropyltrimethoxysilane was changed to 2 parts by weight.

Comparative Example 11

A curable composition was yielded in the same way as in Example 1 except that 2.58 parts by weight of versatic acid were used instead of tin versatate in Example 7.

Comparative Example 12

A curable composition was yielded in the same way as in Example 1 except that 1 part by weight of tetravalent tin (trade name: No. 918, manufactured by Sankyo Organic Chemicals Co., Ltd.) was used instead of tin versatate in Example 7, and N-methyl-1,3-propanediamine was not used.

The curable compositions yielded in example 7 and comparative Examples 11 and 12 were used to make the same evaluations as described above. Furthermore, the transmittance of cured articles therefrom to all light rays and the haze thereof were measured by methods described below. The results are shown in Table 3. Moreover, cured articles were produced therefrom at 23° C. and 50% R.H, and photographs thereof after 10 days from the production are shown in FIG. 1.

(Transmittance to all Light Rays, and Haze)

The curable compositions were each stretched to give a thickness of about 5 mm, thereby forming test pieces each having a flat and smooth surface. At 23° C. and 50% R.H., the test pieces were cured for 10 days to produce cured articles. As for the cured articles, a chromaticity and turbidity meter (manufactured by Nippon Denshoku Industries Co., Ltd.) was used to measure the transmittance thereof to all light rays, and the haze thereof. The transmittance to all light rays is a value obtained by dividing the amount of all light rays passing through any one of the test pieces by the amount of rays radiated thereinto. As the transparency is higher, the transmittance is larger. The haze is the degree of cloudy external appearance. The value thereof is larger as light is scattered.

TABLE 3

|  |  |  | Example | Comparative Examples | |
|---|---|---|---|---|---|
|  |  |  | 7 | 11 | 12 |
| (A) Organic polymer | P-1 |  | 60 | 60 | 60 |
|  | A-1 |  | 40 | 40 | 40 |
| (B) Tin versatate | NEOSTAN U-50 |  | 3.4 |  |  |
|  | Versatic acid | VERSATIC 10 |  | 2.58 |  |
|  | Tetravalent tin | No. 918 |  |  | 1 |
| (C) Amine | N-Methyl-1,3-propane diamine |  | 0.34 | 0.34 |  |
|  | Epoxysilane | A-187 | 2 | 2 | 2 |
|  | Plasticizer | Diisodecyl phthalate | 20 | 20 | 20 |
|  | Silica | Aerosil RY200 | 10 | 10 | 10 |
|  | Antioxidant | STYRENIZED PHENOL | 1 | 1 | 1 |
|  | Ultraviolet absorber | TINUVIN 213 | 1 | 1 | 1 |
|  | Light stabilizer | SANOL LS765 | 1 | 1 | 1 |
| Transparency |  |  | ⊙ | Δ | Δ |
| Transmittance (%) to all light rays |  |  | 88 | 50 | 49 |
| Haze (%) |  |  | 23 | 60 | 66 |
| Coloration of cured article |  |  | Colorless | Colorless | Colorless |
| Stickiness of cured article surface |  |  | ⊙ | Δ | Δ |
| Dirt resistance |  |  | ⊙ | X | Δ |
| Adhesiveness to acrylic plate |  |  | CF | AF | CF |

In the cured article of example 7, wherein tin versatate was used, the transmittance to all light rays was as high as 88%, and the haze was as small as 23%. Thus, it is understood that the transparency thereof was high. On the other hand, in the cured article of comparative Example 11, wherein versatic acid was used, and in that of comparative Example 12, wherein tetravalent tin was used, the transmittances to all light rays were as low as 50% or less, and the hazes were as high as 60% or more. The fact that the transparencies were low is reflected to the numerical values. The external appearances of the cured articles after 10 days from the production thereof are shown in FIG. 1. It is understood that an evident difference is generated in transparency.

What is claimed is:

1. A moisture curable composition comprising:
   (A) an organic polymer having reactive silicon group(s), wherein the organic polymer is a mixture composed of a polyoxypropylene polymer having a reactive silicon group, and a (meth)acrylic acid ester polymer having a reactive silicon group;
   (B) a bivalent tin carboxylate wherein the carbon atom adjacent to the carbonyl group is quaternary;
   (C) an amine compound having no reactive silicon group, and
   (D) silica,
   wherein the component (A) has a group represented by the formula (1)

$$-NR^1-C(=O)-\qquad(1)$$

wherein $R^1$ represents hydrogen atom or substituted or unsubstituted organic group.

2. The curable composition according to claim 1, wherein the component (B) is tin versatate.

3. The curable composition according to claim 1, wherein the component (C) is a diamine compound having no reactive silicon group.

4. The curable composition according to claim 1, wherein the component (D) is hydrophobic silica.

5. The curable composition according to claim 1, wherein the component (D) is fumed silica and/or fine powdery silica.

6. A transparent cured article obtained by curing a moisture curable composition comprising:
   (A). an organic polymer having reactive silicon group(s), wherein the organic polymer is a mixture composed of a polyoxypropylene polymer having a reactive silicon group, and a (meth)acrylic acid ester polymer having a reactive silicon group;
   (B). a bivalent tin carboxylate wherein the carbon atom adjacent to the carbonyl group is quaternary;
   (C). an amine compound having no reactive silicon group; and
   (D). silica.

7. The transparent cured article according to claim 6, wherein the transmittance of all light rays is 70% or more when the article is a sample having a thickness of 5 mm.

8. The transparent cured article according to claim 6, wherein curing time is 7 days or less under the condition of 23° C. and 50% relative humidity.

9. A moisture curable composition for transparent cured article comprising:
   (A). an organic polymer having reactive silicon group(s), wherein the organic polymer is a mixture composed of a polyoxypropylene polymer having a reactive silicon group, and a (meth)acrylic acid ester polymer having a reactive silicon group;
   (B). a bivalent tin carboxylate wherein the carbon atom adjacent to the carbonyl group is quaternary;
   (C). an amine compound having no reactive silicon group; and
   (D). silica.

* * * * *